United States Patent
Koga

(10) Patent No.: US 9,773,335 B2
(45) Date of Patent: Sep. 26, 2017

(54) DISPLAY CONTROL DEVICE AND METHOD

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 16 days.

(21) Appl. No.: 14/599,143

(22) Filed: Jan. 16, 2015

(65) Prior Publication Data

US 2015/0138236 A1    May 21, 2015

Related U.S. Application Data

(63) Continuation of application No. PCT/JP2012/004673, filed on Jul. 23, 2012.

(51) Int. Cl.
*G06T 11/60* (2006.01)
*G09G 3/00* (2006.01)
(Continued)

(52) U.S. Cl.
CPC ............ *G06T 11/60* (2013.01); *G06F 3/00* (2013.01); *G06T 7/246* (2017.01); *G06T 19/006* (2013.01);
(Continued)

(58) Field of Classification Search
None
See application file for complete search history.

(56) References Cited

U.S. PATENT DOCUMENTS

2005/0002558 A1  1/2005  Franke et al.
2008/0211904 A1  9/2008  Kato et al.
(Continued)

FOREIGN PATENT DOCUMENTS

JP  2000-156849 A1  6/2000
JP  2003-123197 A1  4/2003
(Continued)

OTHER PUBLICATIONS

Foxlin, Eric, and Leonid Naimark. "VIS-Tracker: A Wearable Vision-Inertial Self-Tracker." VR 3 (2003): 199.*
(Continued)

*Primary Examiner* — Yu Chen
(74) *Attorney, Agent, or Firm* — Oblon, McClelland, Maier & Neustadt, L.L.P.

(57) ABSTRACT

A display control device includes circuitry configured to acquire a movement distance of an imaging device configured to acquire a plurality of images including a first image and a second image, calculate, when a specific object is detected from the first image, a first positional relationship between the specific object and the imaging device, control a display to superimpose a specific image corresponding to the specific object on the first image based on the first positional relationship, and control the display to superimpose the specific image on the second image based on the first positional relationship, when the specific object is not detected from the second image and the movement distance is smaller than a specific value, the movement distance being from a first position where the first image is captured by the imaging devise to a second position where the second image is captured by the imaging devise.

17 Claims, 23 Drawing Sheets

(51) Int. Cl.
*G06T 19/00* (2011.01)
*G06F 3/00* (2006.01)
*G06T 7/246* (2017.01)

(52) U.S. Cl.
CPC .... *G09G 3/002* (2013.01); *G06T 2207/10004* (2013.01); *G06T 2207/10016* (2013.01); *G06T 2207/30204* (2013.01); *G06T 2215/16* (2013.01)

(56) References Cited

U.S. PATENT DOCUMENTS

| | | | | |
|---|---|---|---|---|
| 2010/0045701 | A1* | 2/2010 | Scott | G01S 5/163 345/633 |
| 2011/0157017 | A1 | 6/2011 | Webb et al. | |
| 2011/0169861 | A1* | 7/2011 | Suzuki | G06T 7/0046 345/632 |
| 2012/0218300 | A1* | 8/2012 | Hayakawa | A63F 13/06 345/633 |
| 2013/0328925 | A1* | 12/2013 | Latta | G09G 3/003 345/633 |
| 2013/0342572 | A1* | 12/2013 | Poulos | G02B 27/017 345/633 |
| 2014/0225919 | A1 | 8/2014 | Kaino et al. | |
| 2015/0070389 | A1 | 3/2015 | Goto et al. | |

FOREIGN PATENT DOCUMENTS

| | | |
|---|---|---|
| JP | 2005-136946 A1 | 5/2005 |
| JP | 2006-018818 A1 | 1/2006 |
| JP | 2010-238096 A1 | 10/2010 |
| JP | 2012-059292 A1 | 3/2012 |
| WO | 2010/094065 A1 | 8/2010 |
| WO | 2013/061504 A1 | 5/2013 |
| WO | 2013/145536 A1 | 10/2013 |

OTHER PUBLICATIONS

International Search Report issued Oct. 16, 2012 for PCT/JP2012/004673 filed Jul. 23, 2012 with English Translation.
Written Opinion issued Oct. 16, 2012 for PCT/JP2012/004673 filed Jul. 23, 2012 with English Translation of p. 3.
Extended Search Report issued Jan. 12, 2016 in European Patent Application No. 12881632.9.
Daniel Wagner. et al., "Robust and Unobtrusive Marker Tracking on Mobile Phones", IEEE International Symposium on Mixed and Augmented Reality, 2008, XP031343986, pp. 121-124.
Office Action issued Aug. 2, 2016 in Japanese Patent Application No. 2014-526607 (with Partial English translation).
Japanese Office Action issued Apr. 19, 2016 in Patent Application No. 2014-526607 (with partial English translation).
Office Action of Japanese Patent Application No. 2014-526607 dated May 23, 2017 with partial English translation, 25 pages.

* cited by examiner

FIG. 9A

| MARKER ID | Xr | Yr | POINTER | ~T1 |
|---|---|---|---|---|
| 0000 | Xr1 | Yr1 | P1 | |
| 0001 | Xr2 | Yr2 | P2 | |
| 0010 | Xr3 | Yr3 | P3 | |

FIG. 9B

| | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| P1 → | 0 | 0 | 1 | 1 | 1 | 0 | 1 | 1 | 1 | 1 | 0 | 1 | 0 | 0 | 0 | 0 | ~R1 |
| P2 → | 1 | 1 | 1 | 1 | 1 | 0 | 1 | 1 | 1 | 1 | 1 | 0 | 0 | 1 | 1 | | |
| P3 → | 1 | 0 | 1 | 1 | 0 | 0 | 0 | 0 | 0 | 0 | 0 | 1 | 1 | 0 | 0 | | |

FIG. 10

| MARKER ID | Xs | Ys | Zs | Ps | Qs | Rs | ~T2 |
|---|---|---|---|---|---|---|---|
| 0000 | Xs1 | Ys1 | Zs1 | Ps1 | Qs1 | Rs1 | |
| 0001 | Xs2 | Ys2 | Zs2 | Ps2 | Qs2 | Rs2 | |
| 0010 | Xs3 | Ys3 | Zs3 | Ps3 | Qs3 | Rs3 | |

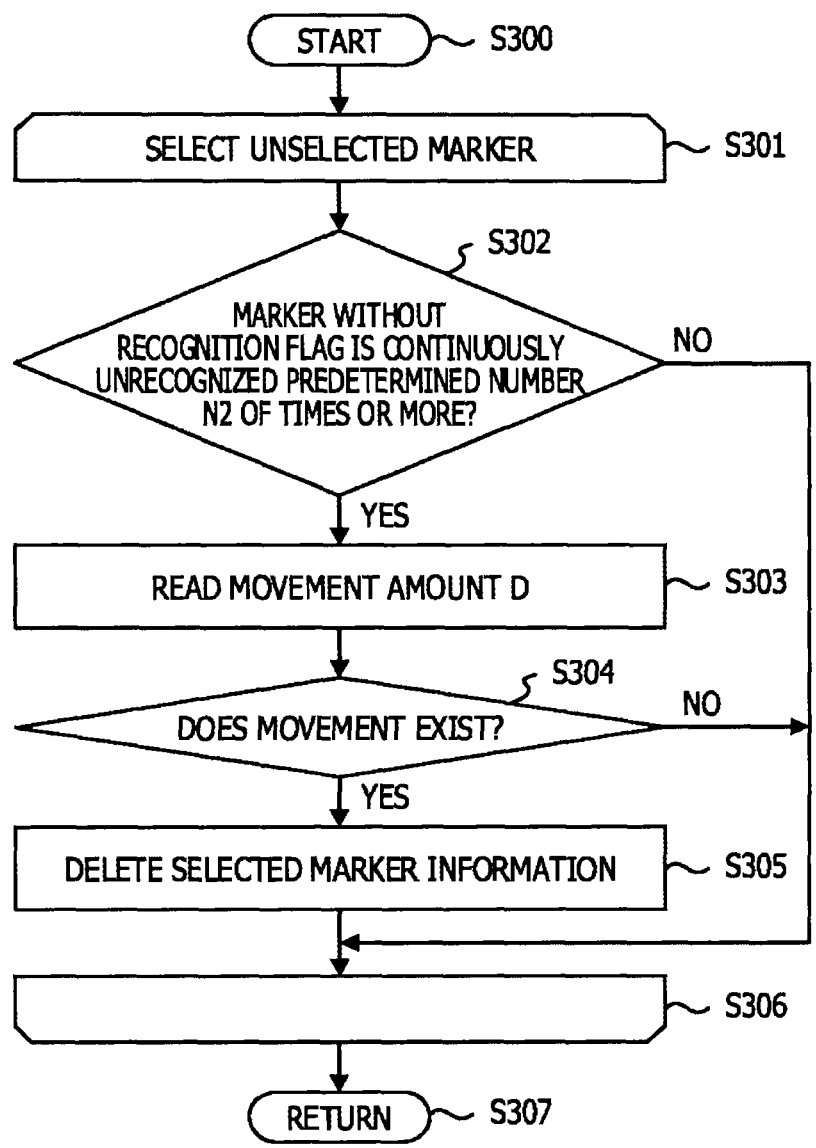

FIG. 15A

| | X | Y | Z | ~T3 |
|---|---|---|---|---|
| A0 | A0x | A0y | A0z | |
| A1 | A1x | A1y | A1z | |
| V0 | V0x | V0y | V0z | |
| V1 | V1x | V1y | V1z | |
| L0 | L0x | L0y | L0z | |
| L1 | L1x | L1y | L1z | |

FIG. 15B

| | X | Y | Z | ~T4 |
|---|---|---|---|---|
| A2 | A2x | A2y | A2z | |
| V2 | V2x | V2y | V2z | |
| L2 | L2x | L2y | L2z | |

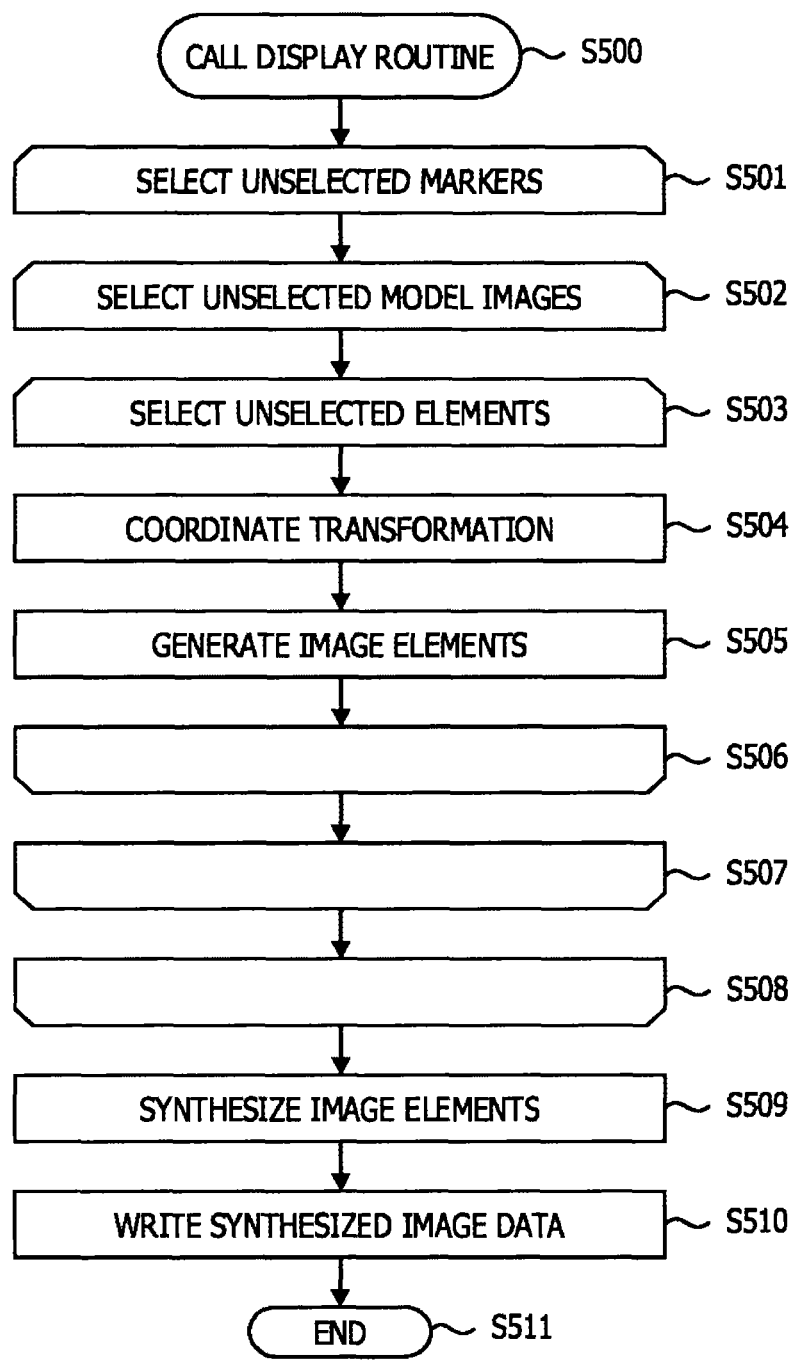

FIG. 17

| MARKER ID | MODEL ID | DISPLAY CONTROL FLAG | ELEMENT ID | TEXTURE ID | CORNER COORDINATES Cm1,Cm2,... |
|---|---|---|---|---|---|
| 0000 | 000 | 1 | 000 | 0011 | |
| | | | 001 | 0011 | |
| | | | 010 | 0011 | |
| | | | 011 | 0011 | |
| | | | 100 | 0011 | |
| | 001 | 1 | 000 | 1010 | |
| | | | 001 | 1010 | |
| | | | 010 | 1010 | |
| | 010 | 0 | 000 | 1110 | |
| | | | 001 | 1110 | |
| | 000 | 1 | 000 | 0011 | |
| | | | 001 | 0011 | |
| ... | ... | ... | ... | ... | ... |

T5

FIG. 19A $$X1 = \begin{bmatrix} \cos Q_s \cos R_s & -\cos Q_s \sin R_s & \sin Q_s & X_s \\ \sin P_s \sin Q_s \cos R_s + \cos P_s \sin R_s & -\sin P_s \sin Q_s \sin R_s + \cos P_s \cos R_s & -\sin P_s \cos Q_s & Y_s \\ -\cos P_s \sin Q_s \cos R_s + \sin P_s \sin R_s & -\cos P_s \sin Q_s \sin R_s + \sin P_s \cos R_s & \cos P_s \cos Q_s & Z_s \\ 0 & 0 & 0 & 1 \end{bmatrix}$$

FIG. 19B $$X2 = \begin{bmatrix} \dfrac{n}{w} & 0 & 0 & 0 \\ 0 & \dfrac{n}{h} & 0 & 0 \\ 0 & 0 & -\dfrac{f+n}{f-n} & -\dfrac{2fn}{f-n} \\ 0 & 0 & -1 & 0 \end{bmatrix}$$

DISPLAY CONTROL DEVICE AND METHOD

CROSS-REFERENCE TO RELATED APPLICATION

This application is a continuation application of International Application PCT/JP2012/004673 filed on Jul. 23, 2012, the entire contents of which are incorporated herein by reference.

FIELD

The technique disclosed in the embodiment is related to a technique for controlling display.

BACKGROUND

There is a technique for matching an image (projected image) obtained by projecting an image model with an image acquired by an imaging element and for displaying the projected image and the acquired image in a region for displaying the acquired image. The display of the matching projected and acquired images is executed by adjusting the position, size, orientation, and the like of the projected image in the display region based on the position, size, orientation, and the like of an image of a reference object included in the acquired image.

As the reference object used to adjust the display of the projected image, an identifier that enables relative positions and relative orientations (relative angles) of the reference object and imaging element to be measured based on the image of the reference object within the acquired image is used. For example, an identifier that is referred to as an augmented reality (AR) marker is used as the reference object. The AR marker is, for example, a printed object on which a design (pattern) from which the relative position and relative angle with respect to the imaging element are measured based on an image obtained by imaging the AR marker itself is printed, or the like. In addition, there is an AR marker from which information may be acquired by analyzing a pattern printed on the AR marker based on an image of the AR marker within an acquired image.

During the display of the projected image, when at least either the relative positions or relative angles of the reference object and imaging element change due to the update of the acquired image, the updated acquired image and the projected image may not match each other. Thus, the projected image is readjusted based on the relative positions and relative angles of the reference object and imaging element. In the readjustment of the projected image, if the image of the reference object is not included in the updated acquired image, the position and size of the displayed projected image to be subjected to the matching with the updated acquired image are unclear and thus control is executed so as to terminate the display of the projected image. As described above, the display of a projected image that may not match the acquired image may be terminated by the control executed to display the projected image based on determination of whether or not the image of the reference object is included in the acquired image.

Regarding redrawing of a projected image, there is a technique for redrawing a projected image only when a value of an orientation sensor installed in a terminal device is equal to or larger than a predetermined value in a state in which the projected image is displayed in a display region. These techniques are disclosed in Japanese Laid-open Patent Publication No. 2010-238096, Japanese Laid-open Patent Publication No. 2000-156849, and Japanese Laid-open Patent Publication No. 2006-18818.

SUMMARY

According to an aspect of the invention, a display control device includes circuitry configured to acquire a movement distance of an imaging device configured to acquire a plurality of images including a first image and a second image, calculate, when a specific object is detected from the first image, a first positional relationship between the specific object and the imaging device, control a display to superimpose a specific image corresponding to the specific object on the first image based on the first positional relationship, and control the display to superimpose the specific image on the second image based on the first positional relationship, when the specific object is not detected from the second image and the movement distance is smaller than a specific value, the movement distance being from a first position where the first image is captured by the imaging devise to a second position where the second image is captured by the imaging devise.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A and 9B illustrate an exemplary data structure of a recognition management table T1 and an exemplary data structure of a storage region R1 storing recognition results, respectively.

FIG. 10 illustrates an example of a marker coordinate table T2.

FIG. 12 illustrates an exemplary flowchart of a process of updating the recognition management table T1.

FIGS. 15A and 15B illustrate an example of a coordinate table T3 and an example of a movement amount table T4.

FIG. 16 illustrates a flowchart of a process of generating an image.

FIG. 17 illustrates an example of a projected image management table T5.

FIGS. 19A and 19B illustrate an example of a transformation matrix X1 and an example of a transformation matrix X2, respectively.

DESCRIPTION OF EMBODIMENT

If a range to be imaged is not changed and an obstacle is placed between an imaging element and a reference object, the reference object is hidden behind the obstacle and an image of the reference object is not included in imaged information. In this case, when the display of the projected image is to be terminated due to the fact that the reference object is not recognized, the display of the projected image is terminated regardless of the fact that it is possible to display the projected image that matches the acquired image.

According to an aspect of the disclosure, it is an object to suppress the fact that the display of a projected image is terminated regardless of the fact that it is possible to display the projected image that matches an acquired image.

Each embodiment is described with reference to the accompanying drawings.

In order to match a projected image with an image acquired by a camera or the like, superimpose the projected image on the acquired image, and display the projected image and the acquired image on a display device that displays the acquired image in real time, a marker such as an AR marker is used as a reference object. The marker is an identifier that enables a relative position and relative angle to an imaging element for acquiring an image to be calculated based on an image of the marker within the acquired image. The projected image is, for example, obtained by adjusting, based on the relative position and relative angle of the marker, a projection angle and size of an image model in which positional relationships from the marker are defined. A shape and design (pattern) of a surface may be defined in the image model in advance, or the image model may be processed based on the acquired image. In addition, the image model itself includes a one-dimensional model, a two-dimensional model, and a three-dimensional model. For example, the model itself may be defined by one-dimensional coordinates or two-dimensional coordinates or may be expressed as three dimensional coordinates by providing invariable coordinates in an undefined direction. The display of the projected image is executed not only on the display device for displaying an acquired image but also on a transmission-type display, for example. When the projected image is displayed on the transmission-type display, the projected image adjusted so as to match an image visually recognized through the transmission-type display is displayed, for example.

Figure 1A:
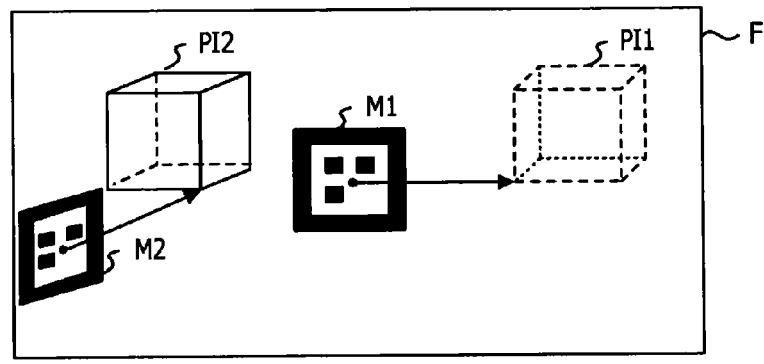
FIGS. 1A, 1B, and 1C illustrate relationships between markers and projected images.
Figure 1B:
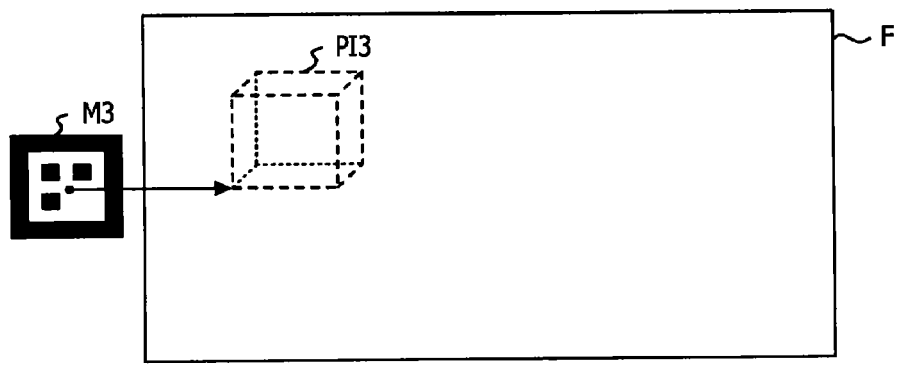
Figure 1C:
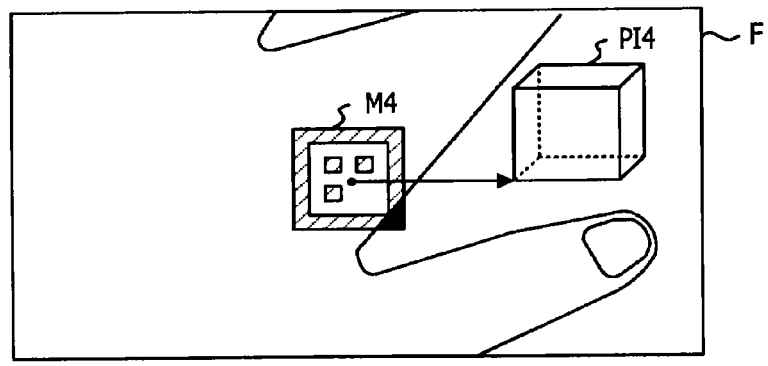

FIGS. 1A, 1B, and 1C are explanatory diagrams illustrating relationships between markers and projected images. A frame F represents a range imaged by an imaging element, while the inside of the frame F represents an example of a display screen for displaying an acquired image and a projected image. In FIGS. 1A to 1C, details that are actually displayed are represented by solid lines, and details that are not actually displayed are represented by dotted lines (arrows are excluded).

FIG. 1A illustrates an example of the display of a projected image when a marker is recognized. In the example illustrated in FIG. 1A, an image of a marker M1 is included in an acquired image. In addition, a projected image PI1 is generated by adjusting, based on a relative position and relative angle of the marker, an image model defined using the marker M1 as a reference. Specified relative positions (corresponding to the arrows illustrated in FIG. 1) to markers and specified shapes (cubes are exemplified in FIG. 1) are included in definitions of image models.

The marker M1 exemplified in FIG. 1A is oriented in a direction nearly parallel to the imaging element, and an arrow that indicates a relative position of the image model to the marker M1 exists on or near a surface of the marker M1. Thus, the marker M1 and the projected image PI1 are displayed so that the depth of the marker M1 and the depth of the projected image PI1 are nearly equal to each other. A projected image PI2 is a projected image of an image model defined using a marker M2 as a reference in the same manner as the projected image PI1. In FIG. 1A, the marker M2 is displayed at a smaller angle than the marker M1. Thus, the projected image PI2 that uses the marker M2 as the reference is displayed so that the depth of the projected image PI2 and the depth of the marker M2 are different from each other. As described using the marker M1 and the marker M2, the positions, sizes, and orientations of the displayed projected images defined using the markers as the references are adjusted based on the images of the markers (or based on how the images of the markers are displayed).

FIG. 1B illustrates an example of an acquired image when a marker is positioned outside the frame. In the example illustrated in FIG. 1B, an image of a marker M3 is not included in the frame F. Thus, even if an image model defined using the marker M3 as a reference exists, the display of a projected image (projected image PI3) corresponding to the image model is not executed. Specifically, if the image of the marker is positioned outside the frame, the reference for the display is unclear and thus the display of the projected image is interrupted. Dotted lines that represent the projected image PI3 in FIG. 1B indicate, for descriptive purposes, that although the three-dimensional model defined using the marker M3 as the reference exists, the projected image PI3 is not displayed due to the fact that the marker M3 is not recognized.

For example, if a projected image using a certain marker as a reference is displayed and a projected image using another marker as a reference is displayed after the projected image using the certain marker as the reference, a camera is pointed toward another object to be imaged and thus the certain marker previously used as the reference may be positioned outside a frame. Switching between the references for the display of the projected images is executed by positioning the marker previously used as the reference outside the frame and positioning the marker newly used as the reference in the frame. In addition, for example, when the display of a projected image using a marker as a reference is terminated, the camera may not be continuously pointed toward objects (a marker used as a reference for display of a projected image, the projected image, and the like) to be imaged. In this case, the marker is positioned outside the frame by another operation (an operation of terminating superimposed display, an operation of inputting to a terminal, or the like) performed by an operator, and the display of the projected image is terminated at a time intended by the operator.

FIG. 1C illustrates an example of an acquired image when a marker is not recognized due to an obstacle (a hand of an operator in the example illustrated in FIG. 1C). In FIG. 1C, a marker M4 is included in the frame F and an image of the marker M4 is not recognized due to the existence of the obstacle. Thus, the display of a projected image PI4 that uses the marker M4 as a reference is interrupted. The interruption of the display of the projected image due to the obstacle is different from the interruption caused by the positioning outside the frame due to the movement of the frame to the other objects to be imaged or an operator's intention such as transition to another operation by the operator and may occur when the operator tries to continuously display the projected image.

If the operator intends to continue to display the projected image and the display of the projected image is interrupted due to the obstacle despite the intention, the interruption may reduce operability. In addition, a case where a scenario in which multiple projected images are displayed in order is included in an application program using the display of the projected images is predicted. If the display of a projected image is interrupted during the execution of the application program, the scenario is returned to a start point, for example. Alternatively, a mechanism for restoring the scenario upon the interruption of the display of a projected image is included in the application program itself. For this case, the display of the projected image is interrupted and thus the interruption, not intended by the operator, of the display of the projected image is suppressed only when it is determined that an image of a marker is not included in an acquired image or when the movement of the imaging element is detected.

Figure 2:
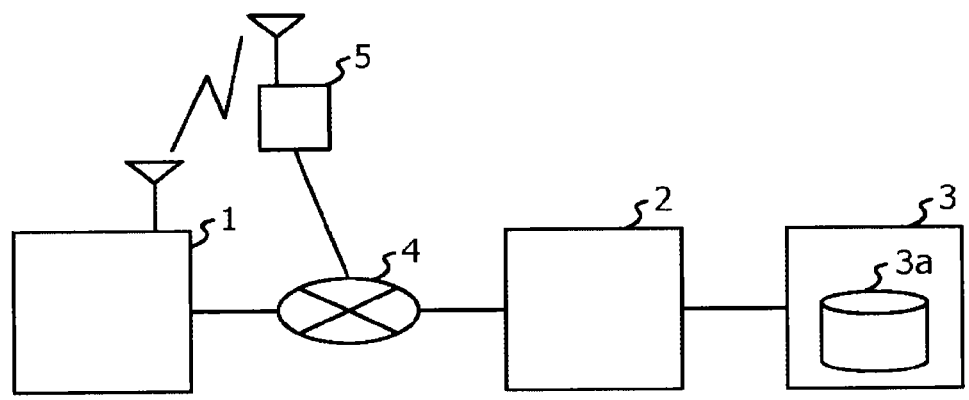
FIG. 2 illustrates an exemplary system configuration according to an embodiment.

FIG. 2 illustrates a configuration of a system according to the present embodiment. The system illustrated in FIG. 2 includes a terminal device 1, a server device 2, a storage device 3, a network 4, and a base station 5. The terminal device 1 and the server device 2 communicate with each other by at least one of communication methods, wire communication and wireless communication. The server device 2 may access a database 3a included in the storage device 3.

Figure 3:
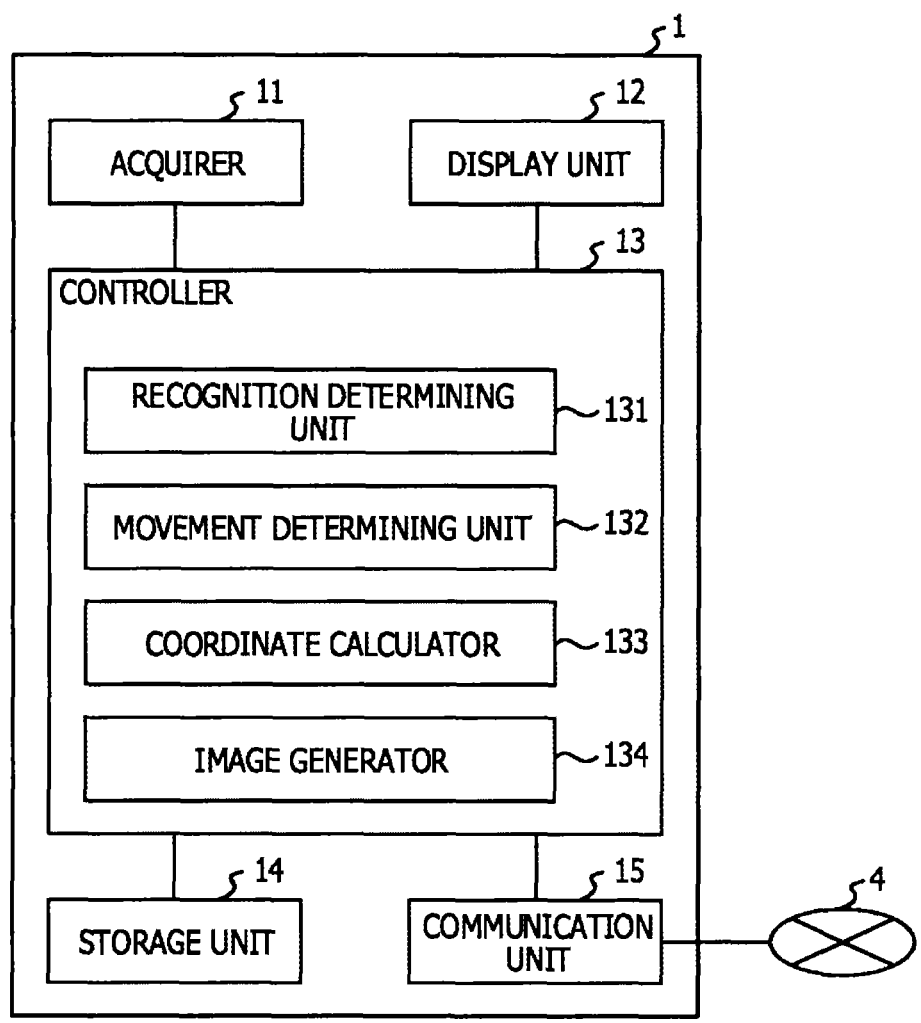
FIG. 3 illustrates an exemplary configuration of functional blocks of a terminal device 1.

FIG. 3 illustrates a configuration of functional blocks of the terminal device 1. The terminal device 1 includes an acquirer 11, a display unit 12, a controller 13, a storage unit 14, and a communication unit 15. The acquirer 11 acquires information measured by sensors included in the terminal device 1. The information acquired by the acquirer 11 is, for example, an image acquired by an imaging element and information (values measured by an acceleration sensor and an angular velocity sensor and the like) indicating the amount of movement of the terminal device 1. For example, the acquirer 11 acquires the information at set time intervals. The display unit 12 displays an image in accordance with control by the controller 13. For example, the display unit 12 displays an image acquired by the acquirer 11 and a projected image as indicated by screens illustrated in FIGS. 1A to 1C. The controller 13 executes a process based on the information acquired by the acquirer 11 and information acquired through the communication unit 15 and controls the display unit 12 and the communication unit 15. The storage unit 14 stores information that is used for the process of the controller 13. For example, the storage unit 14 stores a recognition management table T1, a marker coordinate table T2, a coordinate table T3, a movement amount table T4, a projected image management table T5 illustrated in FIG. 17, and the like, which are described later. The communication unit 15 communicates with devices such as the server device 2 in accordance with control by the controller 13. The controller 13 acquires definition information of a three-dimensional model from the storage unit 12 or acquires the definition information from the server device 2 through communication executed by the communication unit 15. Specifically, there may be a case where only the terminal device 1 operates and a case where the terminal device 1 and the server device 2 collaborate with each other to execute a process.

The controller 13 includes a recognition determining unit 131, a movement determining unit 132, a coordinate calculator 133, and an image generator 134.

The recognition determining unit 131 determines, based on the information acquired by the acquirer 11, whether or not a marker is recognized. The recognition determining unit 131 determines whether or not an image of a marker is included in an acquired image and whether or not the terminal device 1 is moved. For example, the recognition determining unit 131 periodically determines whether or not an image of a marker is included in an acquired image. If an image of a marker in a recognized state is removed from an acquired image, the recognition determining unit 131 determines, based on the amount of movement of the terminal device 1, whether or not the recognized state of the marker is released.

The movement determining unit 132 calculates the amount of movement of the terminal device 1 in response to call of the recognition determining unit 131. The recognition determining unit 131 determines, based on the movement amount calculated by the movement determining unit 132, whether or not a body of the terminal device 1 is moved. The movement amount is calculated by the movement determining unit 132 based on values measured by the acceleration sensor and angular velocity sensor and acquired by the acquirer 11, for example. Alternatively, the movement determining unit 132 may calculate a predicted movement amount based on a history record of positional coordinates of a marker, and the recognition determining unit 131 may determine, based on the predicted movement amount, whether or not a recognized state of the marker is released.

The coordinate calculator 133 executes a process of calculating a relative position and relative angle of a marker with respect to the imaging element based on an image of the marker included in an acquired image in response to call of the recognition determining unit 132. In addition, the coordinate calculator 133 transforms coordinates of corners included in a three-dimensional model in response to call of the image generator 134. Specifically, the coordinate calculator 133 transforms coordinates defined in a coordinate system using a marker as a reference into coordinates indicating a position in a display screen in which the three-dimensional model is displayed. The coordinate transformation is executed based on the calculated relative position and relative angle of the marker.

For a three-dimensional model associated with a marker recognized by the recognition determining unit 131, the image generator 134 generates a projected image corresponding to the three-dimensional model based on the coordinates, transformed by the coordinate calculator 133, of the corners and definitions of the three-dimensional model. The controller 13 controls the display unit 12 so as to cause the display unit 12 to display the image generated by the image generator 134.

Figure 4:
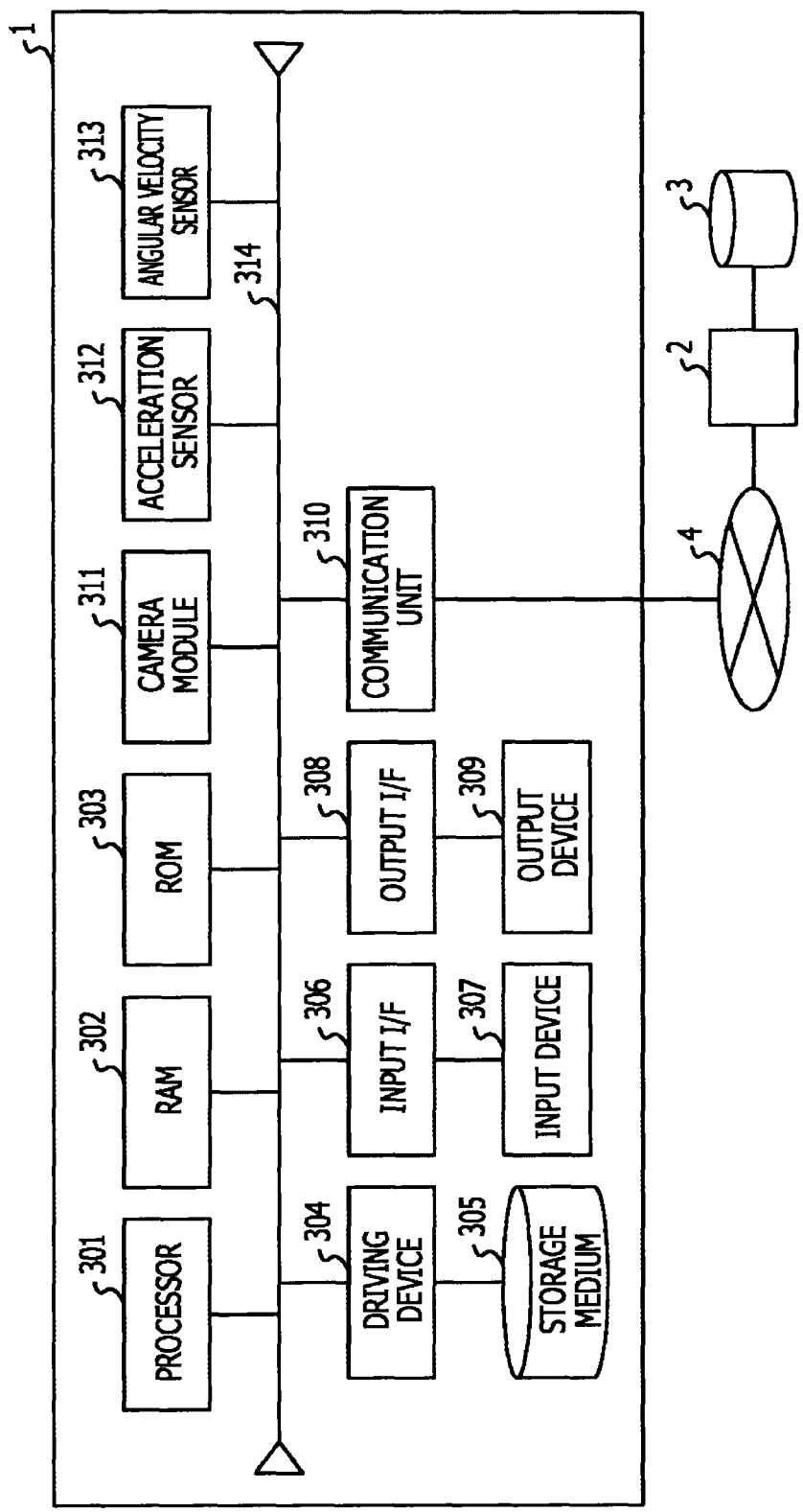
FIG. 4 illustrates an exemplary hardware configuration of the terminal device 1.

FIG. 4 illustrates a hardware configuration of the terminal device 1. The functional blocks illustrated in FIG. 3 are achieved by the hardware configuration illustrated in FIG. 4, for example. The terminal device 1 includes a processor 301, random access memory (RAM) 302, a read only memory (ROM) 303, a driving device 304, a storage medium 305, an input interface (input I/F) 306, an input device 307, an output interface (output I/F) 308, an output device 309, a communication interface (communication I/F) 310, a camera module 311, the acceleration sensor 312, the angular velocity sensor 313, a bus 314, and the like, for example. The hardware parts are connected to each other through the bus 314.

The communication interface 310 controls communication to be executed through the network 4. The communication to be controlled by the communication interface 310 may be access to the network 4 through the base station 5. The input interface 306 is connected to the input device 307 and transfers an input signal received from the input device 307 to the processor 301. The output interface 308 is connected to the output device 309 and causes the output device 309 to execute outputting based on an instruction from the processor 301. The input device 307 is a device configured to transmit an input signal based on an operation. The input device 307 is a key device such as a keyboard or buttons attached to the body of the terminal device 1 or a pointing device such as a mouse or a touch panel. The output device 309 is a device configured to output information in accordance with control by the terminal device 1. The output device 309 is, for example, an image output device (display device) such as a display or an audio output device such as a speaker. As described above, a transmission-type display may be used as the display device. In addition, for example, an input and output device such as a touch screen may be used as the input device 307 and the output device 309. In addition, the input device 307 and the output device 309 may not be included in the terminal device 1 and may be devices to be connected to the terminal device 1 from the outside, for example.

The RAM 302 is a readable and writable memory device. For example, a semiconductor memory such as a static RAM (SRAM) or a dynamic RAM (DRAM) or a flash memory other than RAMs may be used as the RAM 302. The ROM 303 includes a programmable ROM (PROM) and the like. The driving device 304 is a device configured to either read or write or both read and write information from and in the storage medium 305. The storage medium 305 stores information written by the driving device 304. For example, the storage medium 305 is a storage medium such as a hard disk, a compact disc (CD), a digital versatile disc (DVD), or a Blu-ray disc. In addition, for example, the computer 1 may have driving devices 304 and storage media 305 for storage media of multiple types.

The camera module 311 includes the imaging element (image sensor), reads a value measured by the imaging element, and writes the value in an image buffer included in the camera module 311 and provided for input images, for example. The acceleration sensor 312 measures acceleration applied to the acceleration sensor 312. The angular velocity sensor 313 measures an angular velocity of an operation by the angular velocity sensor 313.

The processor 301 reads programs (for example, programs exemplified in FIGS. 7A and 23 and the like) stored in the ROM 303 and the storage medium 305 into the RAM 302 and executes processes of the controller 13 in accordance with procedures of the read programs. In this case, the RAM 302 is used as a work area of the processor 301. The function of the storage unit 14 is achieved by causing the ROM 303 and the storage medium 305 to store program files and data files or causing the RAM 302 to be used as the work area of the processor 301.

In addition, the function of the acquirer 11 is achieved by causing the camera module 311 to generate image data, causing the processor 301 to acquire the generated image data, and causing the processor 301 to acquire values measured by the acceleration sensor 312 and the angular velocity sensor 313. The image data to be transmitted from the camera module 311 to the processor 301 is accumulated in the buffer included in the camera module 311 and provided for input images, and the processor 301 reads the image data from the buffer for input images.

Furthermore, the function of the display unit 12 is achieved by causing the processor 301 to generate image data for output and causing the generated image data to be displayed on the display device that is the output device 309. The image data generated for output by the processor 301 is written in a buffer included in the output interface 308 and provided for output images, and the display device reads the image data from the buffer for output images and displays the read image data.

Figure 5:
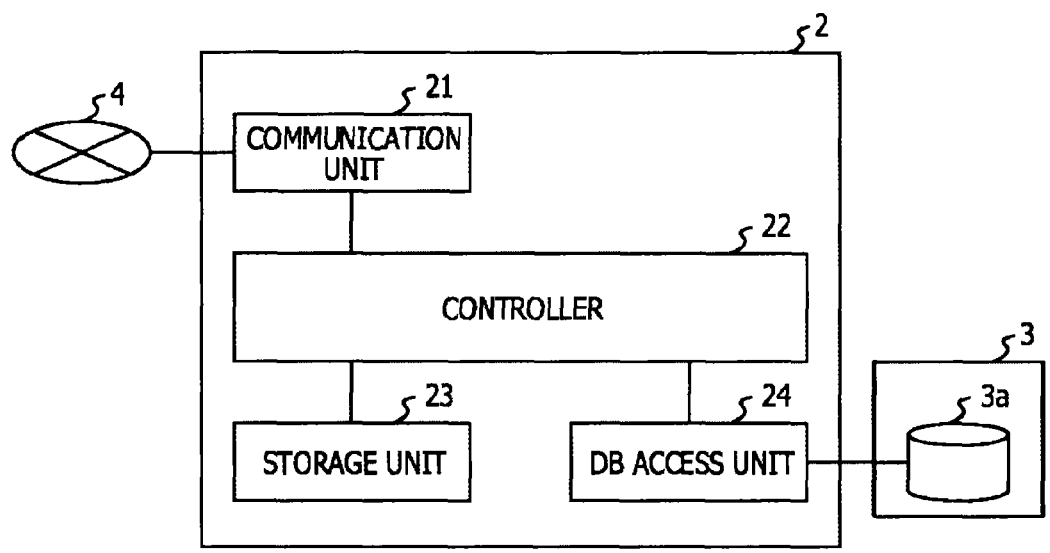
FIG. 5 illustrates an exemplary functional block configuration of a server device 2.

FIG. 5 illustrates an exemplary configuration of functional blocks of the server device 2. The server device 2 includes a communication unit 21, a controller 22, a storage unit 23, and a DB access unit 24. The communication unit 21 communicates with the terminal device 1 in accordance with control by the controller 22. When receiving, from the terminal device 1 through communication executed by the communication unit 21, a request to acquire information, the controller 22 reads the information from the storage unit 23 and causes the communication unit 21 to transmit the read information to the terminal device 1. Alternatively, the controller 22 causes the DB access unit 24 to read the information from the database 3a included in the storage device 3 and causes the communication unit 21 to transmit the read information to the terminal device 1. The information requested by the terminal device 1 to be acquired is, for example, definition information of a three-dimensional model associated with a marker or the like. The storage unit 23 stores the definition information of the three-dimensional model and the DB access unit 24 accesses the database 3a included in the storage device 3 in accordance with control by the controller 22.

Figure 6:
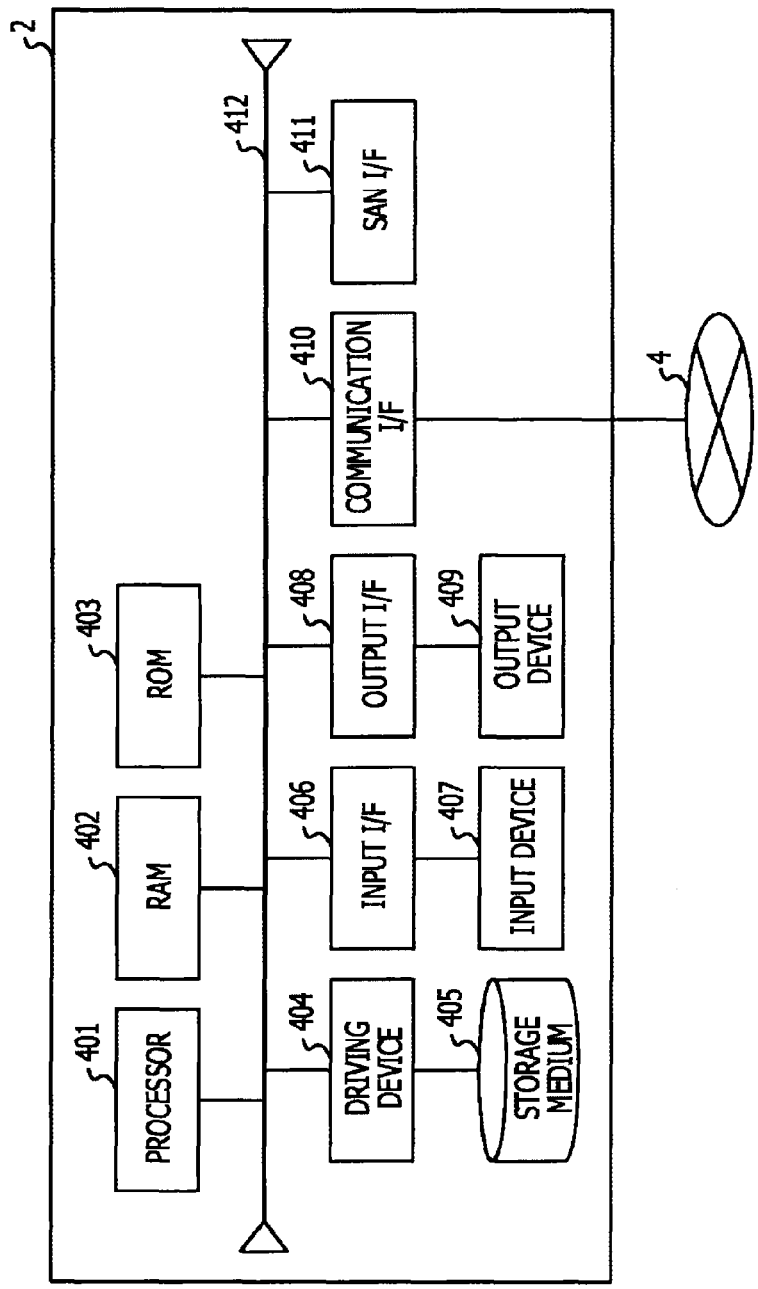
FIG. 6 illustrates an exemplary hardware configuration of the server device 2.

FIG. 6 illustrates a hardware configuration of the server device 2. The functional blocks illustrated in FIG. 5 are achieved by the hardware configuration illustrated in FIG. 6, for example. The server device 2 includes a processor 401, a random access memory (RAM) 402, a read only memory (ROM) 403, a driving device 404, a storage medium 405, an input interface (input I/F) 406, an input device 407, an output interface (output I/F) 408, an output device 409, a communication interface (communication I/F) 410, a storage area network (SAN) interface (SAN I/F) 411, a bus 412, and the like, for example. The hardware parts are connected to each other through the bus 412.

The communication interface 410 controls communication to be executed through network 4. The input interface 406 is connected to the input device 407 and transfers an input signal received from the input device 407 to the processor 401. The output interface 408 is connected to the output device 409 and causes the output device 409 to execute outputting based on an instruction from the processor 401. The input device 407 is a device configured to transmit an input signal in response to an operation. The input device 407 is a key device such as a keyboard or buttons attached to a body of the server device 2 or a pointing device such as a mouse or a touch panel. The output device 409 is a device configured to output information in accordance with control by the server device 2. The output device 409 is, for example, an image output device (display device) such as a display or an audio output device such as a speaker. In addition, for example, an input and output device such as a touch screen may be used as the input device 407 and the output device 409. In addition, the input device 407 and the output device 409 may not be included in the server device 2 and may be devices to be connected to the server device 2 from the outside, for example.

The RAM 402 is a readable and writable memory device. For example, a semiconductor memory such as a static RAM (SRAM) or a dynamic RAM (DRAM) or a flash memory other than RAMs may be used as the RAM 402. The ROM 403 includes a programmable ROM (PROM) and the like. The driving device 404 is a device configured to either read or write or both read and write information from and in the storage medium 405. The storage medium 405 stores information written by the driving device 404. The storage medium 405 is a storage medium such as a hard disk, a compact disc (CD), a digital versatile disc (DVD), or a Blu-ray disc, for example. In addition, for example, the server device 2 may have driving devices 404 and storage media 405 for storage media of multiple types.

The processor 401 reads a program (for example, a program exemplified in FIG. 7B or 23) stored in the ROM 403 and the storage medium 405 into the RAM 402 and executes a process of the controller 22 in accordance with a procedure of the read program. In this case, the RAM 402 is used as a work area of the processor 401. The function of the storage unit 23 is achieved by causing the ROM 403 and the storage medium 405 to store program files and data files (definition information (CAD data) of projected images and the like) or causing the RAM 402 to be used as the work area of the processor 401. In addition, the function of the DB access unit 24, or the function of accessing the database 3a, is achieved by causing the SAN interface 411 to operate in accordance with control by the processor 401.

Figure 7A:
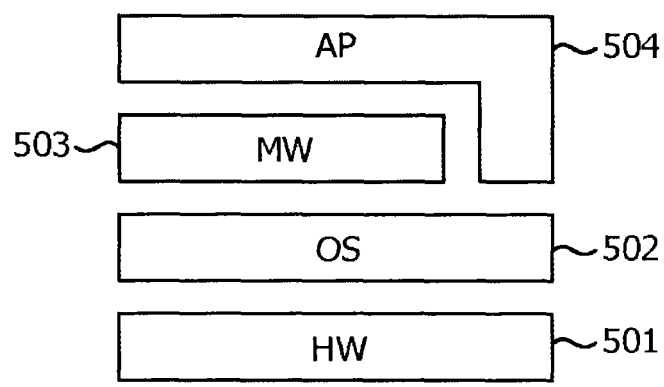
FIGS. 7A and 7B illustrate exemplary configurations of programs to be executed by the terminal device 1 and server device 2.

FIG. 7A illustrates an exemplary configuration of a program to be executed in the terminal device 1. In the terminal device 1, an operating system (OS) 502 that controls a hardware group 501 (hardware illustrated in FIG. 4) is executed. When the processor 301 operates in accordance with a procedure based on the OS 502 and controls and manages the hardware 501, processes of an application program 504 and middleware 503 are executed by the hardware 501. In the terminal device 1, programs such as the OS 502, the middleware 503, and the application program 504 are read into the RAM 302 and executed by the processor 301. In addition, the functions of the acquirer 11, the display unit 12, the controller 13, the storage unit 14, and the communication unit 15 are achieved by causing the processor 301 to execute processes based on the middleware 503 (and causing the hardware 501 to control the processes based on the OS 502). In addition, the middleware 503 and the application program 504 may be separate programs for executing coordinated operations or may be a unified program.

A procedure for a process using a function, included in the middleware 503, of controlling the display of a projected image is described in the application program 504, for example. For example, the scenario in which projected images are displayed in accordance with input, such as the display of the projected images, the detection of the input based on the display, the control of the display of the projected images based on the input, and the like, may be defined in the application program 504, for example. For example, an association flag for a model associated with a marker ID may be changed in the projected image management table T5 described later by a process executed in accordance with the application program 504.

Figure 7B:
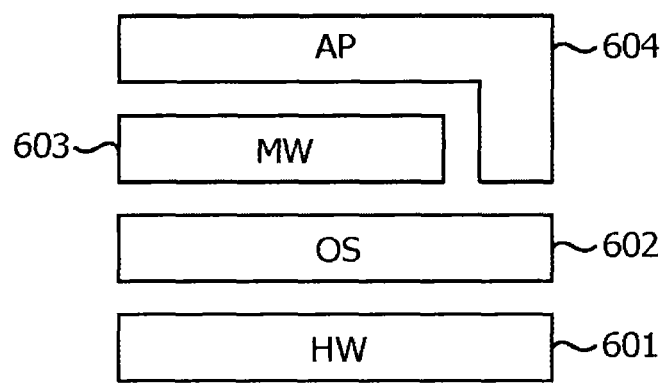

FIG. 7B illustrates an exemplary configuration of a program to be executed in the server device 2. In the server device 2, an OS 602 that controls a hardware group 601 (hardware illustrated in FIG. 6) is executed. When the processor 401 operates in accordance with a procedure based on the OS 602 and controls and manages the hardware 601, processes of an application program 604 and middleware 603 are executed by the hardware 601. In the server device 2, programs such as the OS 602, the middleware 603, and the application program 604 are read into the RAM 402 and executed by the processor 401. In addition, the functions of the communication unit 21, the controller 22, the storage unit 23, and the DB access unit 24 are achieved by causing the processor 401 to execute processes based on the middleware 603 (and causing the hardware 601 to control the processes based on the OS 602). In addition, the middleware 603 and the application program 604 may be separate programs for executing coordinated operations or may be a unified program.

Figure 8:
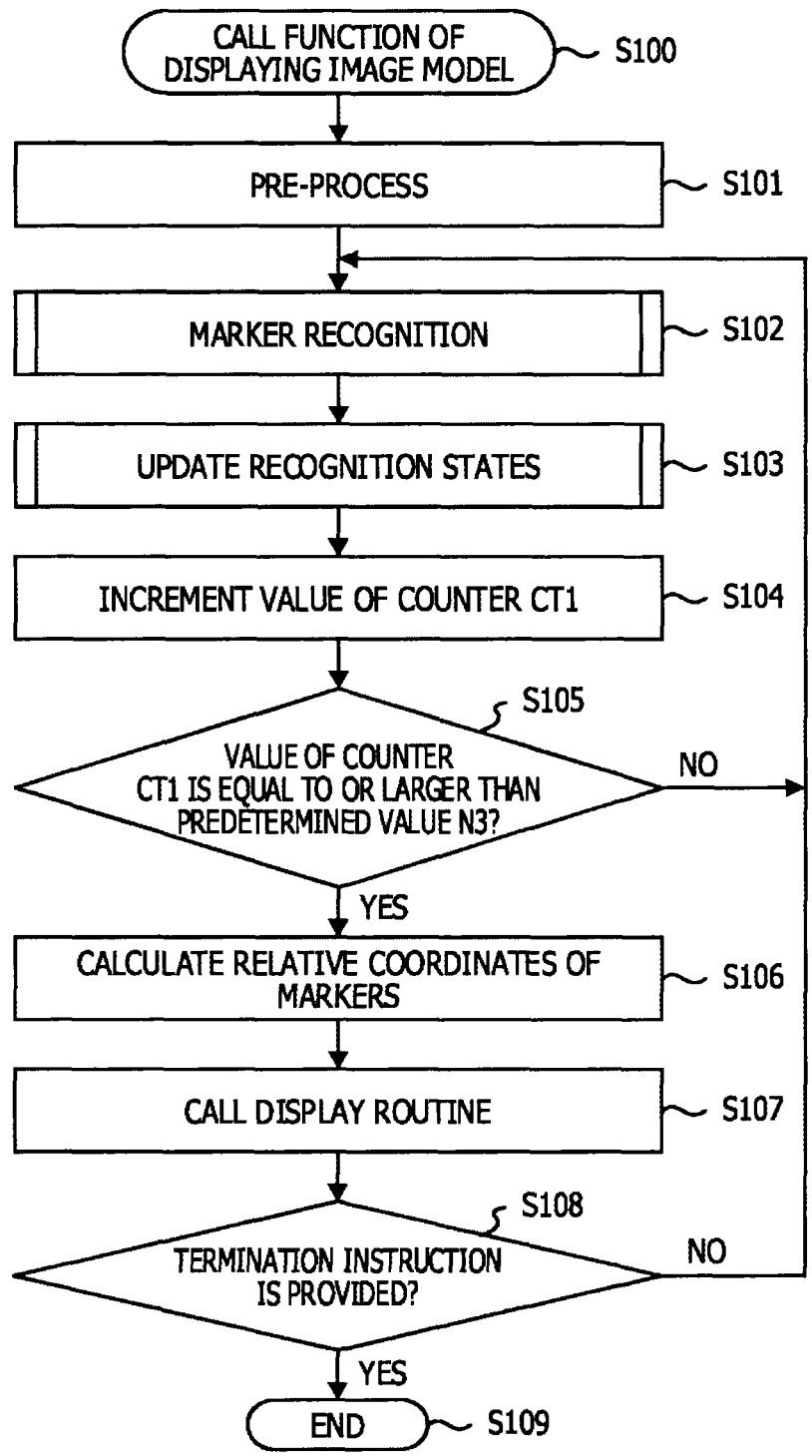
FIG. 8 illustrates an exemplary flowchart of display control.

FIG. 8 illustrates a flowchart of the display control to be executed by the terminal device 1. When a function of displaying a projected image is called (in S100), the controller 13 executes a pre-process (in S101). The function of displaying a projected image is called by a process executed in accordance with a procedure of the application program 504, for example. For example, in the pre-process of S101, the controller 13 starts a process of calculating a movement amount based on acceleration and an angular velocity, secures storage regions of the recognition management table T1 and marker coordinate table T2, reads the projected image management table T5, and the like. In addition, the controller 13 initializes a value of a counter CT1. After the process of S101, the recognition determining unit 131 executes a marker recognition process based on an image acquired from the acquirer 11 (in S102). The marker recognition process of S102 is described later with reference to FIG. 11. The marker recognition process is executed at time intervals I2, for example. The time intervals T2 are one to several times as much as time intervals T1 at which the camera module 311 writes an image read into the image buffer for input images.

FIG. 9A illustrates the recognition management table T1. The recognition management table T1 stores identification information (marker IDs) of markers recognized by the recognition determining unit 131, coordinates (Xr, Yr) indicating the positions of the recognized markers within a screen, and pointers indicating storage destinations of recognition results. The marker IDs are information read by executing image analysis on images of the markers within an acquired image. The marker IDs are the information uniquely identifying the provided markers, for example. The marker IDs may include information identifying the sizes of the markers, for example. If the sizes of the markers are read from the marker IDs, and the coordinate calculator 33 calculates relative positions and relative angles of the markers based on the sizes of the markers, the terminal device 1 may execute a process for markers of multiple types that are different in size.

If the markers are quadrangles, the positions (Xr, Yr) of the markers within the screen that are stored in the recognition management table T1 may be coordinates of the centers of the images of the markers within the acquired image or may be four coordinates indicating each corner. The positions (Xr, Yr) of the markers within the screen are used in order to search the positions of the images of the read markers in the calculation of relative positions and relative angles with respect to the markers. In addition, in FIG. 9A, the latest positions of the markers within the screen are stored, but several history records of the positions (Xr, Yr) of the markers within the screen may be kept and used for prediction of movements of the positions of the markers within the screen.

In addition, the recognition results are stored in a storage region R1 exemplified in FIG. 9B. The storage region R1 is, for example, a storage region for storing a plurality of bit strings each including a predetermined number N1 (16 in an example illustrated in FIG. 9B) of bits. In the storage region R1, a bit string is assigned for storage of a result of recognizing a single marker. For example, as indicated by the recognition management table T1, a result of recognizing a marker with a marker ID "0000" is represented by a bit string of which a start position is indicated by a pointer PT1. For example, if the i-th recognition determination is made for the marker with the marker ID "0000", the result of recognizing the marker is stored at a position shifted by i−1 bits from the position indicated by the pointer PT1. For example, if the marker is recognized, "1" is stored. If the marker is not recognized, "0" is stored. Of course, "1" and "0" may be replaced with each other, or the recognition result may be represented by other information, instead of "1" and "0". For example, the start position of the bit string indicating the result of recognizing the marker with the marker ID "0000" is indicated by the pointer PT1 stored in the recognition management table T1. For example, if the marker with the marker ID "0000" is recognized by the ninth recognition determination, a bit that is located at a position shifted by 8 bits from the position indicated by the pointer PT1 is set to "1". In addition, a region for storing the predetermined number N1 of bits is repeatedly used every time the recognition determination is made the predetermined number N1 of times. In the example illustrated in FIG. 9B, the result of the eighteenth recognition determination is reflected in a bit located at a position shifted by 1 bit from the position indicated by the pointer PT1. Since the process of recognizing a marker is executed at the time intervals I2 as described above, the storage region R1 illustrated in FIG. 9B is repeatedly used every time 16×I2 seconds elapse.

FIG. 10 illustrates the marker coordinate table T2. Positional coordinates (Xs, Ys, Zs) indicating relative positions of markers having marker IDs and recognized by the recognition determining unit 131 with respect to the imaging element, and angular coordinates (Ps, Qs, Rs) indicating relative angles of the markers having the marker IDs and recognized by the recognition determining unit 131 with respect to the imaging element, are stored in the marker coordinate table T2. Ps indicates rotational angles around an x axis of a coordinate system using the imaging element as a reference, Qs indicates rotational angles around a y axis of the coordinate system, and Rs indicates rotational angles around a z axis of the coordinate system.

Return to the description of the flowchart of the display control illustrated in FIG. 8. In S102, the recognition determining unit 131 reads information of the markers and reflects the read information in the recognition management table T1 and the storage region R1 (as described above, if the markers are recognized, corresponding values within the storage region are set to "1"). After the process of S102, the recognition determining unit 131 executes a process of updating the recognition management table T1 based on results of the process of recognizing the markers in S102 (in S103). In the update process of S103, the recognition determining unit 131 deletes, from the recognition management table T1, information on a marker that is not continuously recognized a predetermined number N2 of times or more. The predetermined number N2 is equal to or smaller than the predetermined number N1. As described above, the process of recognizing a marker is executed at the time intervals I2. Thus, if a marker is not recognized for a time period of N2×I2 seconds, information on the marker is deleted from the recognition management table T1. For example, by deleting only a marker that is not continuously recognized by the determination made multiple times, careless deletion of information of an unrecognized marker due to a marker recognition error is suppressed.

When the process of updating the recognition management table T1 in S103 is terminated, the recognition determining unit 131 increments the value of the counter CT1 (in S104) and determines whether or not the value of the counter CT1 reaches a predetermined value N3 (in S105). The predetermined value N3 is any of numbers 1 to N1. If the value of the counter CT1 reaches the predetermined value N3 (YES in S105), the coordinate calculator 133 calculates the relative coordinates (Xs, Ys, Zs) and relative angles (Ps, Qs, Rs) of the markers of which the information is stored in the recognition management table T1 illustrated in FIG. 9A with respect to the imaging element, and the coordinate calculator 133 causes the calculated coordinates to be stored in the marker coordinate table T2 (in S106). In this case, the value of the counter CT1 is reset. If the value of the counter CT1 does not reaches the predetermined value N3 (NO in S105), a region included in the storage region R1 and corresponding to the value of the counter CT1 is cleared (for example, a value is set to "0"). Bits to be cleared are bits included in bit strings within the storage region R1 and located at positions shifted by the value of the counter CT1 from positions indicated by pointers. After the bits are cleared, the recognition determining unit 131 executes the process of S102 again.

When the process of S106 is terminated, the controller 13 calls a routine of displaying a projected image (in S107). After the process of S107, the controller 13 determines whether or not an instruction to terminate the function of displaying a projected image is input (in S108). If the termination instruction is not input (NO in S108), the controller 13 executes the process of S102 again. If the termination instruction is input (YES in S108), the controller 13 terminates the control of the display of the projected image (in S109).

Figure 11:
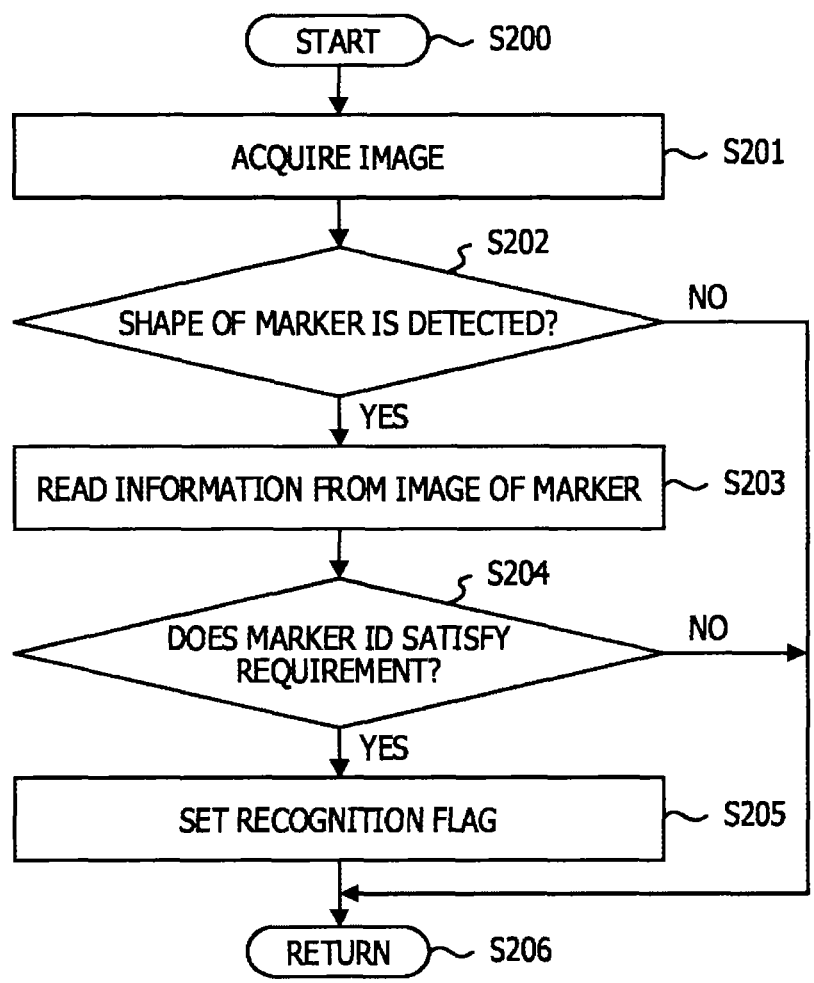
FIG. 11 illustrates an exemplary flowchart of a marker recognition process.

FIG. 11 illustrates a flowchart of the marker recognition process. When the process of S102 is called (in S200), the recognition determining unit 131 reads an image acquired by the acquirer 11 (in S201). In S201, an acquired image may be read for each frame written in the image buffer for input or may be read for a single frame among a specified number of frames. The specified number of frames may be determined in advance or changed based on a process load during the process. The specified number of frames is, for example, determined based on how long the time intervals I2 at which the acquirer 11 reads an image from the image buffer for input are, compared with the time intervals I1 at which an acquired image is written in the image buffer for input.

Next, the recognition determining unit 131 determines whether or not an image of a marker is included in the acquired image read in S201 (in S202). The determination of S202 is made based on whether or not a quadrangular image expressed by thick lines exists if the marker to be recognized is a marker formed in a shape as illustrated in FIG. 1. In this case, for example, image patterns of multiple types that are located near four corners are stored in advance, and whether or not the marker exists is determined based on whether or not four images that match a combination of the stored images located near the four corners are included in the acquired image. In order to make the determination using this method, a combination of images is prepared for a case where markers are oriented in various directions.

If the image of the marker does not exist within the acquired image, the process of S206 is executed. If the fact that the image of the marker is included in the acquired image is detected (YES in S202), the recognition determining unit 131 acquires information by analyzing the image of the marker (in S203). The information acquired by the recognition determining unit 131 in S203 is, for example, coordinates (Xr, Yr) indicating the position of the displayed image of the marker, a marker ID read from a pattern of the marker, and the like. The coordinates (Xr, Yr) of the position of the displayed image are, for example, coordinates of the center of the image of the marker, coordinates of four corners of the image of the marker, or the like. In addition, as described above with reference to FIG. 1, the marker ID is read based on the pattern within the marker. The image (formed in an almost parallelogram or trapezoid) of the detected marker is deformed to a square and the marker ID is extracted based on a pattern included in the deformed image, for example. For example, if the deformed image is binarized, an array of binarized "1" and "0" may be treated as the marker ID without a change.

Next, the recognition determining unit 131 determines whether or not the marker ID acquired in S203 satisfies a requirement CD1 (in S204). The predetermined requirement CD1 is that the size of the marker ID is a predetermined number of bits, or that a value of the marker ID is in a predetermined range, or the like, for example. The requirement CD1 may be specified by a process based on the application program 504. For example, if an application program is used on the assumption that information such as a mobile phone number or the like is used as identification information, the requirement CD1 is that the marker ID is an 11-digit numerical value, a numerical value starting from "090", or the like. In addition, the requirement CD1 may not be set, the determination of S203 may not be made, and the process of S204 may be executed.

If the recognition determining unit 131 determines that the marker ID satisfies the requirement CD1 (YES in S204), the recognition determining unit 131 causes information (the marker ID, the position (Xr, Yr) of the displayed marker, and a pointer indicating a bit string in which a recognition result is stored) on the marker to be stored in the recognition management table T1 (in S205). Regarding details of the process, the recognition determining unit 131 determines whether or not the read marker ID is already stored in the recognition management table T1 in S205. If the read marker ID is already stored in the recognition management table T1, the recognition determining unit 131 updates the recognition management table T1 and reflects the recognition result in the storage region R1. If the read marker ID is not stored in the recognition management table T1, the recognition determining unit 131 adds a new record to the recognition management table T1 and reflects the recognition result in the storage region R1. As described above, the recognition determining unit 131 updates, to "1" (indicating the recognition), a bit that is included in the bit string corresponding to the read marker in the storage region R1 and corresponds to the order indicated by the value of the counter CT1. When the process of S205 is terminated, the process of S103 is executed (in S206). If the marker is not detected (NO in S202) or the marker ID read in S203 does not satisfy the requirement CD1 (NO in S204), the process of S206 is executed.

FIG. 12 illustrates a flowchart of the process of updating the recognition management table T1. When the process of S103 illustrated in FIG. 8 is called (in S300), the recognition determining unit 131 selects a marker ID from among marker IDs stored in the recognition management table T1 (in S301). For example, if the number of markers of which marker ID have been read is N4, the recognition determining unit 131 sequentially selects the first to N4-th records of the recognition management table T1 and repeatedly executes processes of S301 to S306. The recognition determining unit 131 determines whether or not a marker corresponding to a selected record is continuously unrecognized the predetermined number N2 of times or more (in S302). If the recognition determining unit 131 determines that the marker is continuously unrecognized the predetermined number N2 of times or more (YES in S302), the movement determining unit 132 reads, from the movement amount table T4 illustrated in FIG. 15B, a movement amount D of the terminal device 1 (in S303). A process of calculating the movement amount D is described later with reference to FIG. 14. If the recognition determining unit 131 determines that the marker is not continuously unrecognized the predetermined number N2 of times or more (No in S302), the process of S306 is executed.

For example, in the process of S306, if the predetermined number N2 of bits that are up to a bit located at a position indicated by the value of the counter CT1 and are included in a bit string indicated by a pointer within the selected record are "0", the recognition determining unit 131 determines that the marker is continuously unrecognized the predetermined number N2 of times or more. For example, the example illustrated in FIG. 9B assumes that the latest updated bits are the eleventh bit of the bit string and that the predetermined number N2 is 6. In FIG. 9B, the marker with the marker ID "0000" and the marker with the marker ID "0001" are recognized in the recognition determination made in the previous six times (not all the sixth to eleventh bits are 0) and thus the process of S306 is executed. On the other hand, since a marker with a marker ID "0010" is not recognized in the recognition determination made in the previous six times, the process of S303 is executed.

When the movement amount D of the body of the terminal device 1 is read in S303, the movement determining unit 132 determines whether or not the read movement amount D is equal to or larger than a predetermined amount D0 (in S304). If the movement determining unit 132 determines that the movement amount D is equal to or larger than the predetermined amount D0 (YES in S304), the recognition determining unit 131 deletes the selected record from the recognition management table T1 (in S305). If the movement determining unit 132 determines that the movement amount D is smaller than the predetermined amount D0 (No in S304), the process of S306 is executed. In S306, the recognition determining unit 131 determines whether or not an unselected record exists in the recognition management table T1. If the unselected record exists, the process of S301 is executed. If the unselected record does not exist, a process of S307 is executed. In S307, the process flow transitions to the marker management flow illustrated in FIG. 8 and the process of S104 is executed.

Next, the movement amount D is described. The movement amount D is the amount of change over time in acceleration, a velocity, a positional coordinate, or the like, for example. The movement amount D is calculated at time intervals I4, for example.

Figure 13A:
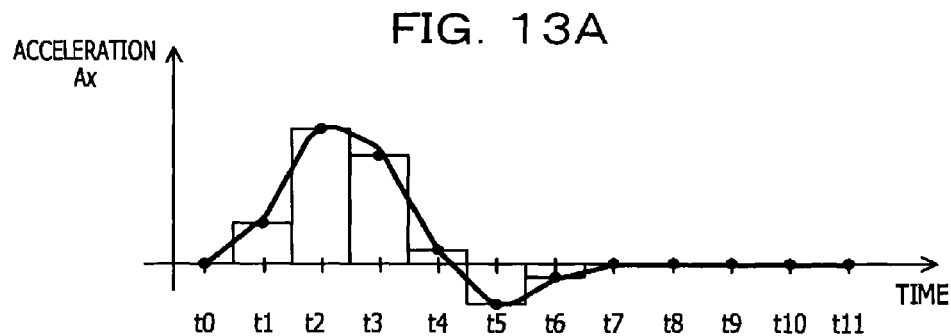
FIGS. 13A, 13B, and 13C illustrate changes over time in acceleration Ax, a velocity Vx, and a positional coordinate Lx, respectively.
Figure 13B:
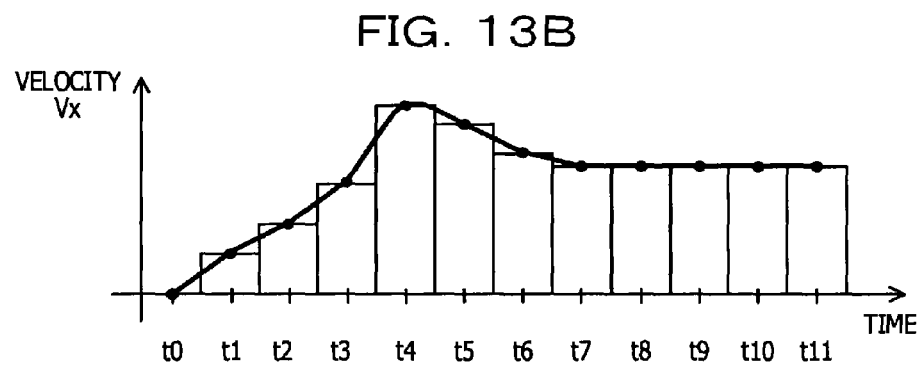
Figure 13C:
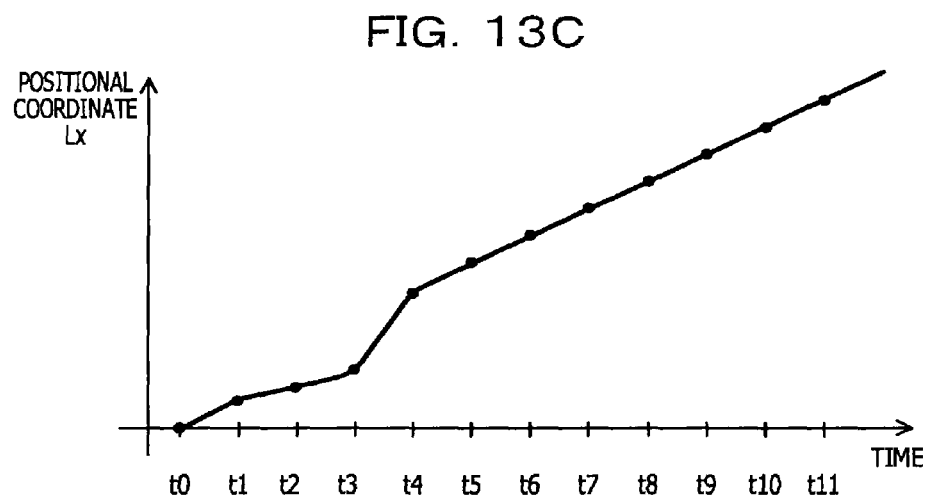

Before a process of calculating the movement amount D is described, relationships between the acceleration, the velocity, and the positional coordinate are described with reference to FIGS. 13A, 13B, and 13C. The abscissas represent a temporal progress, and t0 to t11 indicate times separated by time intervals I5. In examples illustrated in FIGS. 13A to 13C, the time intervals I5 are one fourth of the time intervals I4. FIG. 13A illustrates changes in the acceleration in x direction over time, FIG. 13B illustrates changes in the velocity in x direction over time, and FIG. 13C illustrates changes in the positional coordinate in x direction over time. Although not illustrated in FIGS. 13A to 13C, relationships in the other directions that are the same or similar relationships as or to FIGS. 13A to 13C exist.

FIG. 13A illustrates an example of changes in the acceleration Ax in x direction over time. The ordinate of FIG. 13A represents the acceleration Ax. A curved graph illustrated in FIG. 13A represents changes over time in a value measured by the acceleration sensor. The acceleration Ax in x direction at the time t0 is represented by Ax(t0), and the acceleration Ax in x direction at the time t1 is represented by Ax(t1). The same applies to the times t2 to t11 after the time t1. Since a definite integral of the acceleration corresponds to the velocity, the movement determining unit 132 approximately calculates the definite integral with respect to time by multiplying the acceleration Ax by the time interval I5, for example. A velocity Vx in x direction at the time t0 is represented by Vx(t0), and a velocity Vx in x direction at the time t1 is represented by Vx(t1). Thus, Vx(t1)=Vx(t0)+Ax(t1)×I5.

FIG. 13B illustrates an example of the velocity Vx in x direction that is calculated based on changes over time in the acceleration Ax illustrated in FIG. 13A. In FIG. 13B, the abscissa represents time and the ordinate represents the velocity Vx in x direction. A curved graph illustrated in FIG. 13B represents changes over time in the velocity Vx calculated when the time intervals I5 are set to a sufficiently short value. The velocity Vx is actually obtained at the finite time intervals I5 and discretely changes from the value Vx(t0) through Vx(t1), Vx(t2), . . . . In order to calculate the positional coordinate Lx based on the velocity Vx, a definite integral of the approximately obtained velocity Vx is calculated. As a result, for example, the positional coordinate Lx in x direction at the time t1 is Lx(t1)=Lx(t0)+Vx(t1)×I5.

FIG. 13C illustrates an example of the positional coordinate Lx in x direction that is calculated based on the changes over time in the velocity Vx illustrated in FIG. 13B. In FIG. 13C, the abscissa represents time and the ordinate represents the changes in the positional coordinate Lx in x direction. A curved graph illustrated in FIG. 13C represents the changes over time in the positional coordinate Lx obtained when the time intervals I5 are set to the sufficiently short value, and the calculation of the velocity Vx and the calculation of the positional coordinate Lx are executed. The positional coordinate Lx is actually obtained at the finite time intervals I5.

Figure 14:
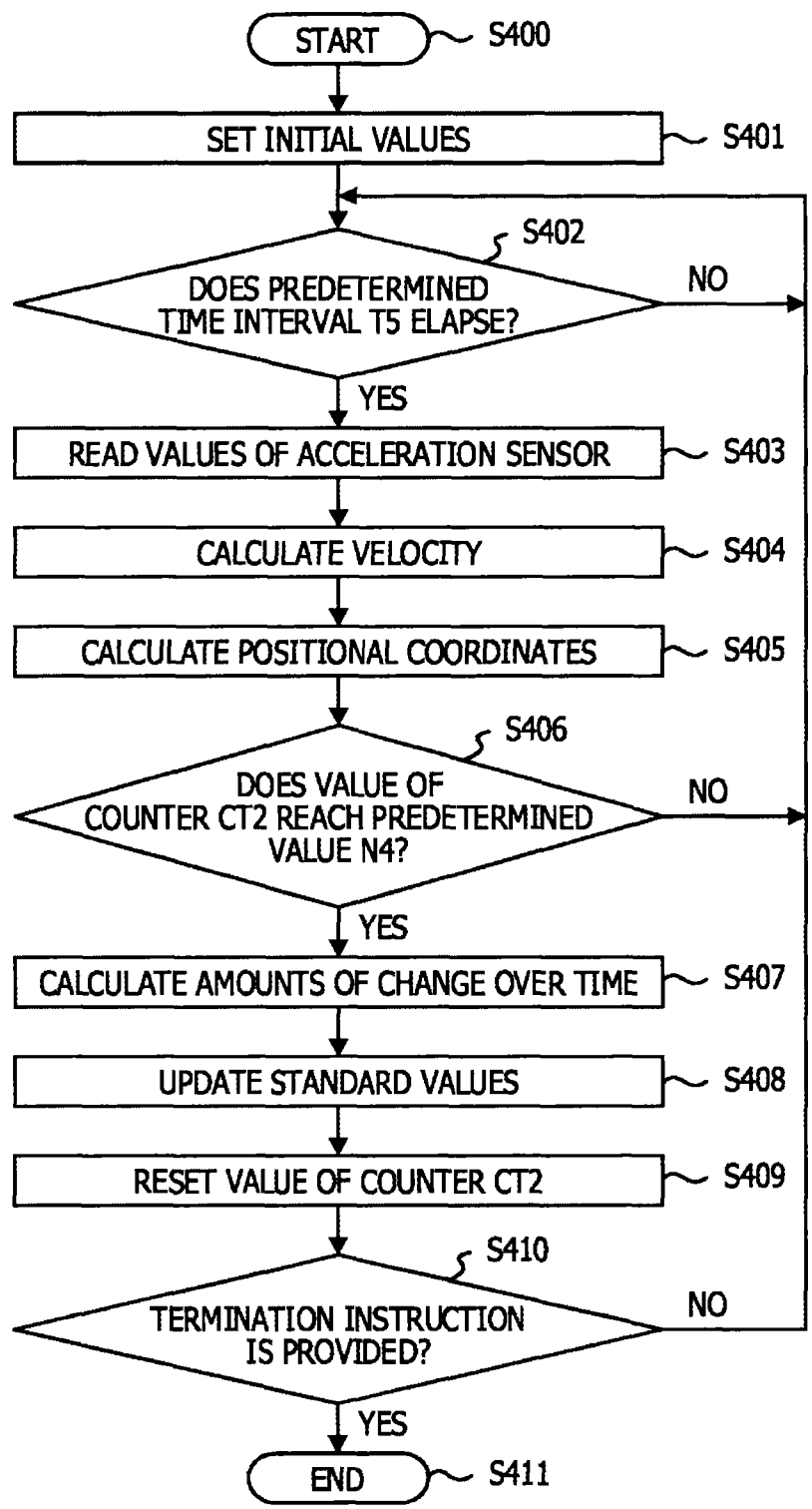
FIG. 14 illustrates an exemplary flowchart of a process of calculating a movement amount.

FIG. 14 illustrates a flowchart of the calculation of the movement amount D. In S303 illustrated in FIG. 12, the movement determining unit 132 calculates the movement amount D based on information acquired by the acquirer 11 at each of the time intervals I4. When the movement determination process is started in S303 (in S400), the movement determining unit 132 sets initial values (in S401). The initial values of the acceleration, the initial values of the velocity, and the initial values of the positional coordinates are stored in the coordinate table T3 illustrated in FIG. 15A. In addition, the movement determining unit 132 initializes a value of a counter CT2.

The coordinate table T3 illustrated in FIG. 15A is an example of a table storing the acceleration, the velocity, and the positional coordinates. In the example illustrated in FIG. 15A, values of x, y, and z components of the acceleration and velocity and values of positional coordinates in x, y, and z directions are stored in the coordinate table T3.

In the example illustrated in FIG. 15A, standard values used to calculate the amounts of change in the acceleration over time are stored in a record of acceleration A0. Measured values of the acceleration are stored in a record of acceleration A1. Standard values used to calculate the amounts of change in the velocity over time are stored in a record of a velocity V0. Calculated values of the velocity are stored in a record of a velocity V1. Standard values used to calculate the amounts of change in the positional coordinates over time are stored in a record of positional coordinates L0. Calculated values of the positional coordinates are stored in a record of positional coordinates L1. The values in x, y, and z directions are stored in the records of the acceleration A0 and A1, the records of the velocities V0 and V1, and the records of the positional coordinates L0 and L1. For example, the initial values, stored in the process of S401, of the acceleration, velocity, and positional coordinates are stored in the records of the acceleration A0 and A1, the records of the velocities V0 and V1, and the records of the positional coordinates L0 and L1.

Return to the description of the flow illustrated in FIG. 14. The movement determining unit 132 determines whether or not the time interval I5 elapses (in S402). If the time interval I5 does not elapse (NO in S402), a process of S403 is not executed until the elapse of the time interval I5. The time interval I5 may be one fourth of the time interval I4, like the example illustrated in FIG. 13, for example. If the time interval I5 elapses (YES in S402), the movement determining unit 132 increments the value of the counter CT2, reads values of the acceleration sensor, and updates the x, y, and z components stored in the record of the acceleration A1 in the coordinate table T3 to the values of the acceleration sensor (in S403). Next, the movement determining unit 132 calculates the velocity based on the acceleration A1 recorded in S403, the velocity V1 stored in the coordinate table T3, and the like and updates the velocity V1 of the coordinate table T3 to x, y, and z components of the calculated velocity (in S404). The velocity V1 is calculated by an equation of (the velocity V1 (updated value)=velocity V1 (value before the update)+the acceleration A1×the time interval I5) or the like, for example. In addition, the movement determining unit 132 calculates positional coordinates based on the velocity V1 recorded in S404 and the like and updates the positional coordinates L1 of the coordinate table T3 to the calculated positional coordinates L1 in x, y, and z directions (in S405). The positional coordinates L1 are calculated by an equation of (the positional coordinates L1 (updated values) =L1 (values before the update)+the velocity V1×the time interval I5) or the like, for example.

Next, the movement determining unit 132 determines whether or not the value of the counter CT2 reaches the predetermined value N4 (in S406). If the value of the counter CT2 does not reach the predetermined value N4

(NO in S406), the movement determining unit 132 executes the determination process of S402 again. The predetermined number N4 is determined based on the time interval I4 and the time interval I5 so as to ensure that when the value of the counter CT2 reaches the predetermined number N4, the time interval I4 elapses. As illustrated in the examples illustrated in FIG. 13, if the time intervals I5 are one fourth of the time intervals I4, N4 is 4.

If the value of the counter CT2 reaches the predetermined value N4 (YES in S406), the movement determining unit 132 calculates the amounts of change over time in the acceleration, velocity, and positional coordinates (in S407). Specifically, the amounts of change in the acceleration, velocity, and positional coordinates are calculated as differences A2 (=A1−A0) between the acceleration, differences V2 (=V1−V0) between the velocities, and differences L2 (=L1−L0) between the positional coordinates. The movement determining unit 132 causes the calculated amounts A2, V2, and L2 of change over time to be stored in the movement amount table T4 illustrated in FIG. 15B.

FIG. 15B illustrates an example of the movement amount table T4. The amounts A2 of change over time in the acceleration in x, y, and z directions, the amounts V2 of change over time in the velocity in x, y, and z directions, and the amounts L2 of change over time in the positional coordinates in x, y, and z directions are stored in the movement amount table T4 illustrated in FIG. 15B at the time intervals I4. In addition, the movement amount table T4 may have a region for storing absolute amounts (the squares of the amounts of change in x direction+the squares of the amounts of change in y direction+the squares of the amounts of change in z direction) of change over time in the acceleration, velocity, and positional coordinates, while the absolute amounts do not depend on the directions. In addition, the movement amount table T4 may have a region for storing the amounts (the squares of the amounts of change in x direction+the squares of the amounts of change in y direction) of change that are calculated excluding the amounts of change in z direction extending from the body of the terminal device toward an object to be imaged.

In addition, the movement determining unit 132 updates the standard values used to calculate the amounts of change over time (in S408). Specifically, the movement determining unit 132 copies the values stored in A1 to A0, copies the values stored in V1 to V0, and copies the values stored in L1 to L0. Furthermore, the movement determining unit 132 resets the value of the counter CT2 (in S409) and determines whether or not a termination instruction is provided (in S410). If the termination instruction is provided (YES in S410), the movement determining unit 132 terminates the process (in S411). If the termination instruction is not provided (NO in S410), the movement determining unit 132 makes the determination of S402 again.

In S304 illustrated in FIG. 12, the movement determining unit 132 uses, as the movement amount D, at least the amounts A2 of change over time in the acceleration, the amounts V2 of change over time in the velocity, or the amounts L2 of change over time in the positional coordinates, while the amounts A2, V2, and L2 are stored in the movement amount table T4, for example. In the process of S303 illustrated in FIG. 12, if changes in these parameters are larger than set values, the movement determining unit 132 determines that the terminal device 1 is moved.

In addition, values of the angular velocity sensor 313 may be used for the calculation of the movement amount D, instead of the values of the acceleration sensor 312. In the movement amount calculation based on angular velocities, a procedure that is similar to the movement amount calculation based on the acceleration is used. The movement amount calculation based on values of the angular velocity sensor is described with reference to the flowchart of the movement amount calculation (illustrated in FIG. 14) based on values of the acceleration sensor.

When the movement determination process is started in S303 (in S400'), the movement determining unit 132 sets initial values (in S401'). The initial values of an angular velocity and the initial values of an angle are stored. Values of angular velocities ω0 and ω2 stored in the storage unit 14 are treated as the initial values of the angular velocity, and angles θ0 and θ1 are treated as the initial values of the angle. In addition, the movement determining unit 132 initializes the value of the counter CT2.

The movement determining unit 132 determines whether or not the time interval I5 elapses (in S402'). If the time interval I5 does not elapse (NO in S402'), a process of S403' is not executed until the elapse of the time interval I5. If the time interval I5 elapses (YES in S402'), the movement determining unit 132 increments the value of the counter CT2, reads a value of the angular velocity sensor, and updates the value of the angular velocity ω1 to the read value of the angular velocity sensor (in S403'). Next, the movement determining unit 132 calculates an angle based on the angular velocity ω1 updated in S403' and the value of the angle θ1 and updates the angle θ1 (in S404'). The angle θ1 is calculated by an equation of (angle θ1 (updated value) =the angle θ1 (value before the update)+the angular velocity ω1×the time interval I5) or the like, for example. In addition, in the process based on the angular velocity sensor, a process that corresponds to S405 is omitted.

Next, the movement determining unit 132 determines whether or not the value of the counter CT2 reaches the predetermined value N4 (in S406'). If the value of the counter CT2 does not reach the predetermined number N4 (NO in S406'), the movement determining unit 132 executes the determination process of S402' again. If the value of the counter CT2 reaches the predetermined value N4 (in S407'), the movement determining unit 132 calculates the amounts of change over time in the angular velocity and angle. Specifically, the amounts of change over time in the angular velocity and angle are calculated as the difference ω2 (=ω1−ω0) between the angular velocities and the difference θ2 (=θ1−θ0) between the angles. The movement determining unit 132 treats the calculated amounts ω2 and θ2 as movement amounts.

In addition, the movement determining unit 132 updates the standard values used to calculate the amounts of change over time (in S408'). Specifically, the movement determining unit 132 copies the value of ω1 to θ0 and copies the value of θ1 to θ0. In addition, the movement determining unit 132 resets the value of the counter CT2 (in S409') and determines whether or not a termination instruction is provided (in S410'). If the termination instruction is provided (YES in S410'), the movement determining unit 132 terminates the process (in S411'). If the termination instruction is not provided (NO in S410'), the movement determining unit 132 makes the determination of S402' again.

In addition, the movement amount may be calculated using values of the acceleration sensor 312 and values of the angular velocity sensor 313. For example, the movement amount D may be calculated by multiplying the amounts L2 of change in the positional coordinates L2 over time and the amounts of change in the angle θ2 by coefficients α1 and α2 and calculating an equation of (the movement amount D=α1×L2+α2×θ2) or the like. In this case, for example, the value of the coefficient $\alpha 2$ may be adjusted based on a value of Zs stored in the coordinate table T2. As the position of a marker is farther, a possibility that the body of the terminal device 1 is positioned outside the frame due to a horizontal movement is lower. Thus, as the value of Zs is larger, the value of $\alpha 1$ is adjusted to a smaller value, for example.

In addition, the predetermined value D0 that is a standard for the determination using the movement amount D is determined based on the size of the frame and a viewing angle. For example, if the amount of change in the angle over time is treated as the movement amount D, and a half of the viewing angle is treated as the predetermined amount D0, a range to be imaged changes by a half of a screen or more within the time interval I4, and a possibility that a marker is not included is high. If the determination is made using the acceleration as the movement amount D, a movement amount that is highly likely to cause a marker to be positioned outside the frame is set as the predetermined amount D0.

In addition, for example, the movement amount may be determined using a predicted position, calculated based on a history record of positional coordinates (Xr, Yr) at which an image of a marker is displayed on the display device, of the image of the marker. For example, several groups of positional coordinates (Xr, Yr) generated at the time intervals I2 are stored. If coordinates obtained by extrapolation prediction based on the stored positional coordinate groups are coordinates located outside the frame, it is determined that the body of the terminal device 1 is moved. In addition, if the positional coordinates obtained by the extrapolation prediction are located in the frame, it is determined that the body of the terminal device 1 has not moved.

Next, how the display of a projected image is controlled is described.

When the display routine is called in S107 illustrated in FIG. 8, the coordinate calculator 133 transforms coordinates of corners defined in an image model based on the relative coordinates and relative angles of the markers that have been calculated in S106. In addition, the image generator 134 executes control so as to generate, based on the coordinates transformed by the coordinate calculator 133, an image obtained by projecting the image model in an imaging screen and write the generated projected image in the image buffer.

FIG. 16 illustrates a procedure for generating the projected image by the coordinate calculator 133 and the image generator 134. When the display routine is called (in S500), the image generator 134 selects unselected markers ID from among marker IDs stored in the recognition management table T1 (in S501). For example, if the number of markers of which the marker IDs have been read is N4, the image generator 134 sequentially select the first to N4-th records of the recognition management table T1 and repeatedly executes processes of S501 to S508. In S501, the coordinate calculator 133 calculates a transformation matrix X based on coordinates Csi (Xsi, Ysi, Zsi), associated with the selected marker IDs and stored in the marker coordinate table T2, of markers. The transformation matrix X is described later. Next, the image generator 134 selects image models defined using, as references, the markers identified by the marker IDs selected in S501 (in S502).

Information of the image models is stored in the projected image management table T5 illustrated in FIG. 17, for example. In the projected management table T5, information such as marker IDs, identification information (model IDs) of image models associated with markers, display control flags for the image models, identification information (element IDs) of elements included in the image models, identification information (texture IDs) of textures of the elements, and coordinates Cmi (Xmi, Ymi, Zmi) of a corner included in each of the elements is stored. The coordinates Cmi of corners included in the elements are coordinates defined using corresponding markers as references (for example, the centers of the markers are the origins of coordinate systems).

A plurality of model IDs may be associated with a single marker ID. No model ID may be associated with a single marker ID. In the projected image management table T5, the display control flags are provided for the model IDs, respectively. A projected image is generated for an image model for which a display control flag is set. A projected image is not generated for an image model for which a display control flag is not set. The display control flags are turned on or off by a process executed in accordance with the application program 504. In addition, a single image model is composed of one or more constituent elements. In the projected image management table T5, one or more element IDs are associated with a single model ID and stored.

The texture IDs are identification information indicating designs of the constituent elements. In addition, the corner coordinates Cmi indicate coordinates of a corner included in each of the constituent elements of the projected image. For example, if a number n of corner coordinates Cmi (i=1 to n) are specified, the image generator 134 generates an image in which a design corresponding to a texture ID is arranged in a surface region corresponding to the corner coordinates Cm1 to Cmn. The image generator 134 acquires a two-dimensional image with the design corresponding to the texture ID from the storage unit 14 or the server device 2. For example, a plurality of two-dimensional images corresponding to a plurality of texture IDs are stored in the storage unit 14, the storage unit 23 of the server device 2, the database 3a, or the like.

In S502, unselected model IDs are selected from among model IDs associated with the marker IDs selected in S501 in the projected image management table T5. Next, the image generator 134 selects unselected element IDs from among element IDs associated with the model IDs selected in S502 in the projected image management table T5 (in S503).

The coordinate calculator 133 uses the transformation matrix X calculated in S501 to transform the corner coordinates Cmi (i=1 to n) associated with the element IDs selected in S503 and stored in the projected image management table T5 to corner coordinates Cdi (i=1 to n) (in S504).

Next, the image generator 134 generates, within a region surrounded by the corner coordinates Cdi (i=1 to n) transformed in S504, image elements having added thereto patterns based on textures corresponding to the elements selected in S503 (in S505). If there is an unselected element among the elements corresponding to the model IDs selected in S502, the image generator 134 executes S503 again (in S506). In addition, if there is an unselected model ID among the model IDs corresponding to the marker IDs selected in S501, the image generator 134 executes S502 again (in S507). Furthermore, if there is an unselected marker in the projected image management table T5, the image generator 134 executes S501 again (in S508).

The image generator 134 synthesizes the image elements generated for the elements in S505 and generates a projected image (in S509). In S509, the image generator 134 superimposes the image elements on each other in the order based on values of Zdi that are coordinates in a depth direction with respect to the imaging element. For example, the image generator 134 superimposes the image elements on each other so as to ensure that an image element located in front of the image element is located on an upper side. The projected image generated in S509 is displayed by the display unit 12 (in S510), and the display routine is terminated (in S511). Specifically, for example, the projected image generated in S509 is written by the controller 13 in a buffer provided for output images and included in the display device that is the output device 309. The display unit 12 displays a written projected image every time display update is executed. Specifically, the projected image displayed by the display unit 12 is updated every time the display routine of S107 is called.

Next, the coordinate transformation that is executed using the transformation matrix X is described.

Figure 18A:
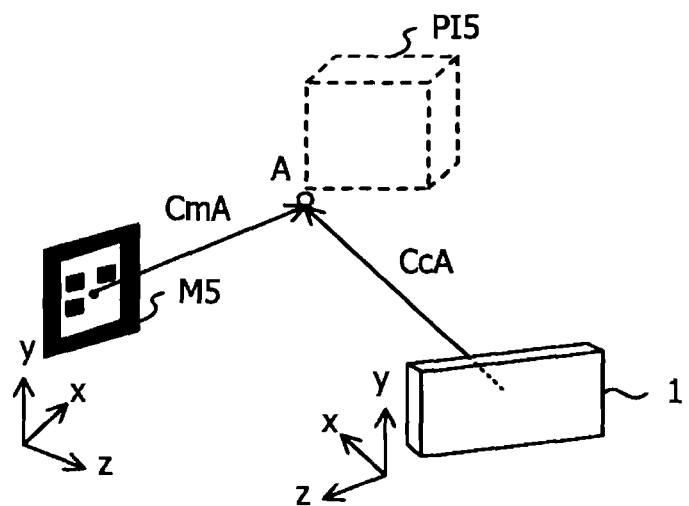
FIGS. 18A and 18B illustrate a relationship between a marker coordinate system and a camera coordinate system and a screen coordinate system, respectively.

FIG. 18A illustrates a positional relationship between a marker and the terminal device 1. For example, it is assumed that a corner A of an image model PI5 is located at coordinates CmA (XmA, YmA, ZmA) in a marker coordinate system using a marker M5 as a reference. The terminal device 1 is located at a different position from the marker M5. Thus, The corner A in a coordinate system (camera coordinate system) using the terminal device 1 as a reference is expressed by coordinates CcA (XcA, YcA, ZcA) that are different from the coordinates CmA. The coordinates CcA in the camera coordinate system are obtained by applying, to the coordinates CmA, the transformation matrix X1 for transforming coordinates of the marker coordinate system to the camera coordinate system. The transformation matrix X1 is calculated based on relative coordinates (Xs, Ys, Zs) of the marker M5 with respect to the terminal device 1 and relative angles (Ps, Qs, Rs) of the marker M5 with respect to the terminal device 1.

FIG. 19A illustrates the transformation matrix X1. The marker coordinate system is a coordinate system rotated by Ps around X axis with respect to the camera coordinate system, rotated by Qs around Y axis with respect to the camera coordinate system, rotated by Rs around Z axis with respect to the camera coordinate system, translated by Xs in x direction, translated by Ys in y direction, and translated by Zs in z direction. Thus, when the transformation matrix X1 is applied, the operation is reversed.

Figure 18B:
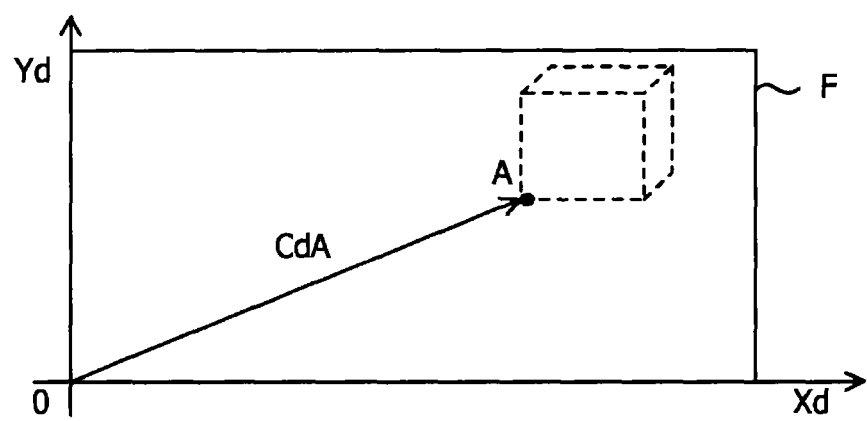

When perspective transformation is executed on the coordinates of the corner A in the camera coordinate system, coordinates CdA in a screen coordinate system are obtained. In the perspective transformation, the magnitudes of coordinates in x and y directions are corrected based on coordinates in z direction, and if the corrected coordinates are reflected in an acquired image, the coordinates are transformed to coordinates indicating how far the coordinates are from the center in x and y directions. In the perspective transformation, as the magnitudes of coordinates in x, y, and z directions in the camera coordinate system are larger, the coordinates are multiplied by smaller coefficients and reduced. For example, it is assumed that a transformation matrix for executing the perspective transformation on coordinates expressed in the camera coordinate system is a transformation matrix X2. FIG. 18B illustrates the position of the corner A when the coordinates of the corner A are transformed to the screen coordinate system.

FIG. 19B illustrates the transformation matrix X2. W, h, n, and f are invariables determined based on the size of a camera screen and a viewing angle of a camera. W is an invariable indicating the width of the screen, and h represents the height of the screen. In addition, n and f are parameters for adjusting the perspective of the displayed screen.

If a perspective image is generated from a model image, the image generator 134 transforms the marker coordinate system to the screen coordinate system for corners included in the model image. A transformation matrix X used in this case is calculated by an equation of (the transformation matrix X=X1×X2 ("×" represents a product of the matrices)).

Next, another exemplary system configuration is described. For example, the terminal device 1 may function as a camera and the server device 2 may manage markers and control the display of image models. For example, there is an application in which an operator may remotely operate the terminal device 1 and performs a task based on an image acquired from the terminal device 1.

Figure 20:
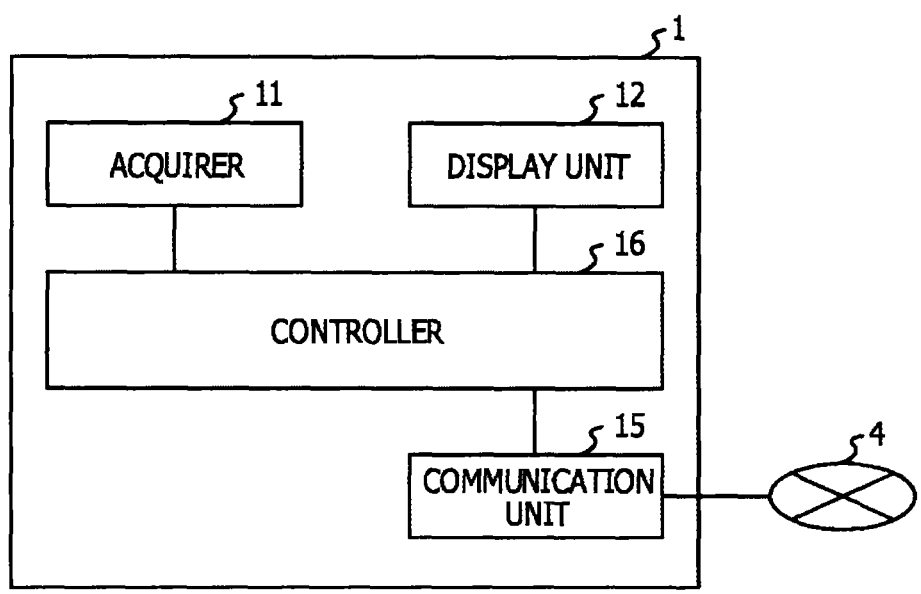
FIG. 20 illustrates an exemplary configuration of functional blocks of the terminal device 1.

FIG. 20 illustrates an exemplary configuration of functional blocks of the terminal device 1 in the other system configuration. The terminal device 1 includes the acquirer 11, the display unit 12, the communication unit 15, and a controller 16. The acquirer 11, the display unit 12, and the communication unit 15 execute the same processes as the terminal device 1 illustrated in FIG. 3. The controller 16 controls the communication unit 15 and transmits information acquired by the acquirer 11 to the server device 2. In addition, when receiving a display instruction from the server device 2, the controller 16 causes the display unit 12 to execute display based on the display instruction.

Figure 21:
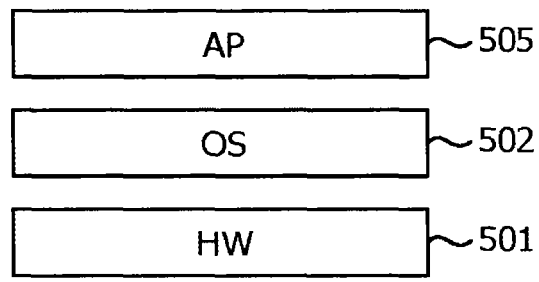
FIG. 21 illustrates an exemplary configuration of a program of the terminal device 1.

FIG. 21 illustrates an exemplary program configuration of the terminal device 1 in the other system. Hardware (HW) 501 of the terminal device 1 is controlled based on an operating system (OS) 502 in which a process to be executed in accordance with a procedure of an application program (AP) 506 is defined. The application program 506 includes a function of communicating an acquired image and sensor information and a function of displaying a received image. The hardware 501 and the operating system 502 are the same as those illustrated in FIG. 7A.

Figure 22:
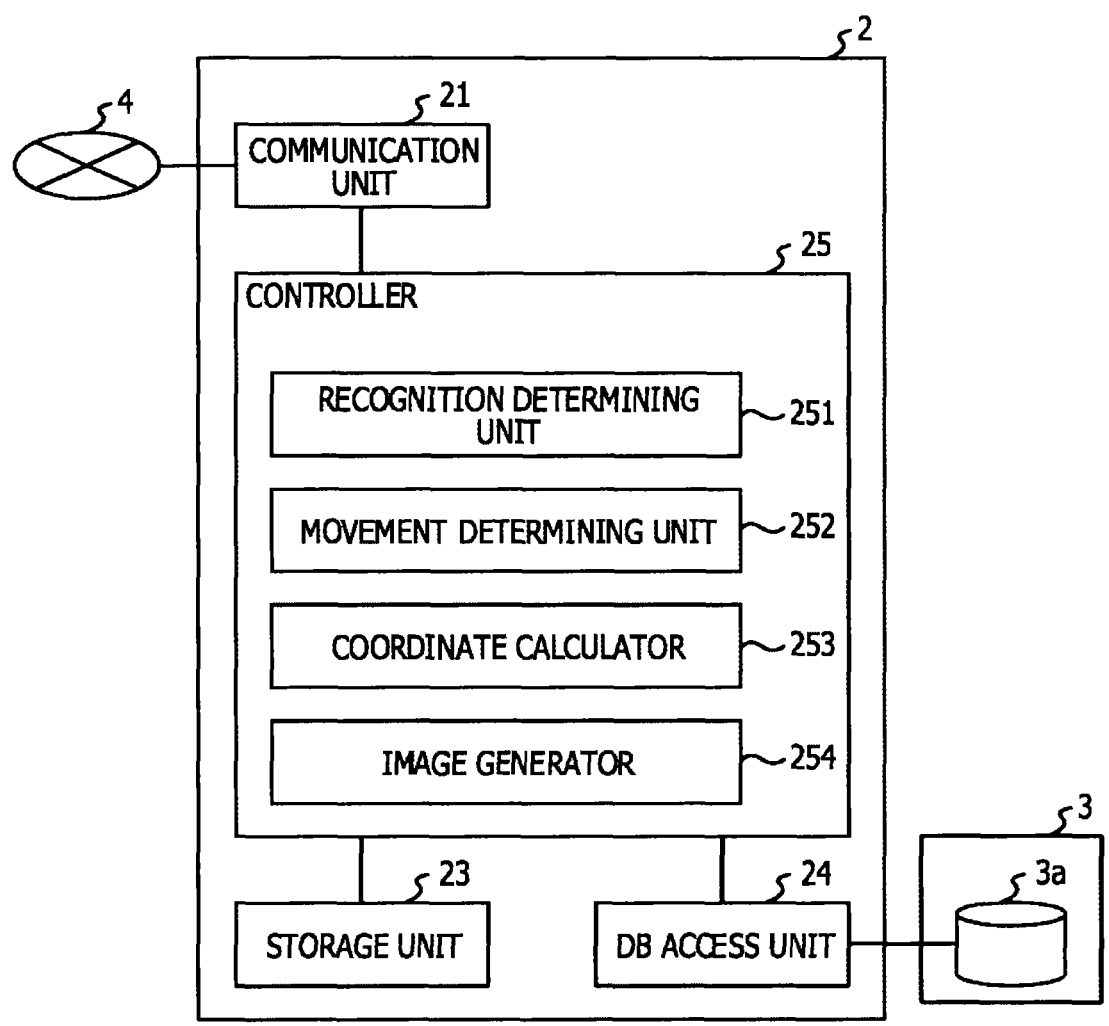
FIG. 22 illustrates an exemplary configuration of functional blocks of the server device 2.

FIG. 22 illustrates an exemplary functional block configuration of the server device 2 in the other system. The server device 2 includes the communication unit 21, the storage unit 23, the DB access unit 24, and a controller 25. In addition, the controller 25 includes a recognition determining unit 251, a movement determining unit 252, a coordinate calculator 253, and an image generator 254. The communication unit 21, the storage unit 23, and the DB access unit 24 execute the same processes as the server device 2 illustrated in FIG. 5. The controller 25 controls the display of an image model based on information received from the terminal device 1 illustrated in FIG. 20. The recognition determining unit 251, the movement determining unit 252, the coordinate calculator 253, and the image generator 254 execute the same processes as the recognition determining unit 131, the movement determining unit 132, the coordinate calculator 133, and the image generator 134.

Figure 23:
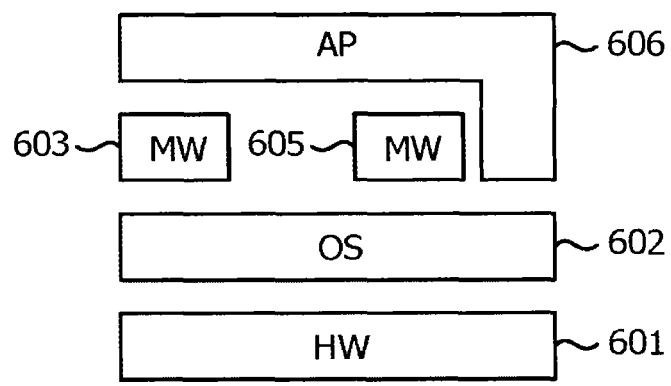
FIG. 23 illustrates an exemplary configuration of a program of the server device 2.

FIG. 23 illustrates an exemplary program configuration of the server device 2 in the other system. In the server device 2, hardware (HW) 601 is controlled by an operating system (OS) 602 that has received process requests of an application program (AP) 606 and middleware (MW) 603 and 605. The hardware 601, the operating system 602, and the middleware 603 are the same as those illustrated in FIG. 7B. The middleware 605 is different from the middleware 603 illustrated in FIGS. 7B and 23 and causes the hardware 601 to achieve the functions of the recognition determining unit 251, the movement determining unit 252, the coordinate calculator 253, and the image generator 254, for example. The application program 606 includes a function of providing the scenario to the operator and includes a function of calling, in response to an instruction of the operator, the control of the display of an image model. When the display control is called by a process based on the application program 606, the server device 2 activates the middleware 605 and executes the display control based on the flow illustrated in FIG. 8.

When the terminal device 1 illustrated in FIG. 3 and the server device 2 illustrated in FIG. 5 are used, a projected image that is to be displayed based on an image acquired by the acquirer 11 is generated by the terminal device 1 and displayed by the display unit 12 of the terminal device 1. When the terminal device 1 illustrated in FIG. 21 and the server device 2 illustrated in FIG. 23 are used, a projected image is generated by the server device 2 and displayed by at least one of the terminal device 1 and the server device 2.

The embodiment described above is an example and may be modified within the scope of the disclosure. In addition, for detailed contents of the processes described above, techniques that are known to those skilled in the art are appropriately used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display control device comprising:
    circuitry configured to:
        acquire a plurality of images including a first image and a second image from an imaging device,
        calculate, when a specific object is detected from the first imaae, a first positional relationship between the specific object and the imaging device,
        control a display to display a specific image on the first image based on the first positional relationship, the specific image corresponding to the specific object that is detected from the first image,
        acquire a sensing value from a sensor at each specific time intervals, the sensor sensing movement of the imaging device,
        calculate a movement amount of the imaging device at the each specific time intervals based on the sensing value,
        calculate an accumulated movement amount of the imaging device within a plurality of specific time intervals by accumulating two or more movement amounts,
        acquire the accumulated movement amount when the second image is acquired from the imaging device,
        control the display to continue displaying the specific image on the second image regardless of a direction of movement corresponding to the accumulated movement amount when the specific object is not detected from the second image and the accumulated movement amount is smaller than a specific value, and
        control the display to stop displaying the specific image on the second image regardless of the direction of movement corresponding to the accumulated movement amount when the specific object is not detected from the second image and the accumulated movement amount is equal to or larger than the specific value.

2. The display control device according to claim 1, wherein the circuitry is configured to determine whether the accumulated movement amount is equal to or larger than the specific value when the specific object is not detected from the second image after the specific object is detected from the first image.

3. The display control device according to claim 1, wherein
    the second image is captured after a specific number of images are captured from the first image, and
    the circuitry is configured to determine whether the accumulated movement amount is equal to or lamer than the specific value when the specific object is not detected from the specific number of images and the second image after the specific object is detected from the first image.

4. The display control device according to claim 1, wherein the specific image is displayed on the first image based on a predetermined position with reference to the specific object and the first positional relationship.

5. The display control device according to claim 1, wherein the sensor is at least one of an acceleration sensor and an angular velocity sensor that is included in the display control device.

6. The display control device according to claim 1, wherein the specific value is determined based on a range to be imaged by the imaging device.

7. A display control method executed by circuitry, the display control method comprising:
    acquiring a plurality of images including a first image and a second image from an imaging device;
    calculating, when a specific object is detected from the first image, a first positional relationship between the specific object and the imaging device;
    controlling a display to display a specific image on the first image based on the first positional relationship, the specific image corresponding to the specific object that is detected from the first image;
    acquiring a sensing value from a sensor at each specific time intervals, the sensor sensing movement of the imaging device;
    calculating a movement amount of the imaging device at the each specific time intervals based on the sensing value;
    calculating an accumulated movement amount of the imaging device within a plurality of specific time intervals by accumulating two or more movement amounts;
    acquiring the accumulated movement amount when the second image is acquired from the imaging device;
    controlling, by the circuitry, the display to continue displaying the specific image on the second image regardless of a direction of movement corresponding to the accumulated movement amount when the specific object is not detected from the second image and the accumulated movement amount is smaller than a specific value; and
    controlling, by the circuitry, the display to stop displaying the specific image on the second image regardless of the direction of movement corresponding to the accumulated movement amount when the specific object is not detected from the second image and the accumulated movement amount is equal to or larger than the specific value.

8. The display control method according to claim 7, further comprising:
determining whether the accumulated movement amount is equal to or larger than the specific value when the specific object is not detected from the second image after the specific object is detected from the first image.

9. The display control method according to claim 7, wherein
the second image is captured after a specific number of images are captured from the first image, and
the display control method comprises determining whether the accumulated movement amount is equal to or larger than the specific value when the specific object is not detected from the specific number of images and the second image after the specific object is detected from the first image.

10. The display control method according to claim 7, wherein the specific image is displayed on the first image based on a predetermined position with reference to the specific object and the first positional relationship.

11. The display control method according to claim 7, wherein the sensor is at least one of an acceleration sensor and an angular velocity sensor that is included in the display control device.

12. The display control method according to claim 7, wherein the specific value is determined based on a range to be imaged by the imaging device.

13. A non-transitory computer-readable storage medium storing a display control program, when executed by a computer, causes the computer to:
acquire a plurality of images including a first image and a second image from an imaging device,
calculate, when a specific object is detected from the first image, a first positional relationship between the specific object and the imaging device,
control a display to display a specific image corresponding to the specific object on the first image based on the first positional relationship, the specific image corresponding to the specific object that is detected from the first image,
acquire a sensing value from a sensor at each specific time intervals, the sensor sensing movement of the imaging device,
calculate a movement amount of the imaging device at the each specific time intervals based on the sensing value,
calculate an accumulated movement amount of the imaging device within a plurality of specific time intervals by accumulating two or more movement amounts,
acquire the accumulated movement amount when the second image is acquired from the imaging device,
control the display to continue displaying the specific image on the second image regardless of a direction of movement corresponding to the accumulated movement amount when the specific object is not detected from the second image and the accumulated movement amount is smaller than a specific value, and
control the display to stop displaying the specific image on the second image regardless of the direction of movement corresponding to the accumulated movement amount when the specific object is not detected from the second image and the accumulated movement amount is equal to or larger than the specific value.

14. The non-transitory computer-readable storage medium according to claim 13, wherein the display control program causes the computer to detemine whether the accumulated movement amount is equal to or larger than the specific value when the specific object is not detected from the second image after the specific object is detected from the first image.

15. The non-transitory computer-readable storage medium according to claim 13, wherein
the second image is captured after a specific number of images are captured from the first image, and
the display control program causes the computer to determine whether the accumulated movement amount is equal to or larger than the specific value when the specific object is not detected from the specific number of images and the second image after the specific object is detected from the first image.

16. The non-transitory computer-readable storage medium according to claim 13, wherein the specific image is displayed on the first image based on a predetermined position with reference to the specific object and the first positional relationship.

17. The non-transitory computer-readable storage medium according to claim 13, wherein the sensor is at least one of an acceleration sensor and an angular velocity sensor that is included in the display control device.

* * * * *